United States Patent
Song et al.

(10) Patent No.: US 8,744,023 B1
(45) Date of Patent: Jun. 3, 2014

(54) INTERFERENCE WHITENING FILTERS FOR MIMO MAXIMUM LIKELIHOOD RECEIVERS

(75) Inventors: Leilei Song, Sunnyvale, CA (US); Rohit U. Nabar, Sunnyvale, CA (US); Kedar Shirali, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 1449 days.

(21) Appl. No.: 11/946,707

(22) Filed: Nov. 28, 2007

Related U.S. Application Data

(60) Provisional application No. 60/867,488, filed on Nov. 28, 2006, provisional application No. 60/868,440, filed on Dec. 4, 2006.

(51) Int. Cl.
*H04L 1/00* (2006.01)

(52) U.S. Cl.
USPC ........... 375/346; 375/254; 375/278; 375/284; 375/285; 375/371

(58) Field of Classification Search
USPC ......... 375/226–227, 316, 340, 346–350, 144, 375/148; 455/63.1, 114.2, 278.1; 370/201
See application file for complete search history.

(56) References Cited

U.S. PATENT DOCUMENTS

| | | | |
|---|---|---|---|
| 7,266,146 B2 * | 9/2007 | Pare et al. | 375/232 |
| 8,014,366 B2 * | 9/2011 | Wax et al. | 370/338 |
| 2003/0190000 A1 * | 10/2003 | Matsumoto | 375/350 |
| 2004/0171366 A1 * | 9/2004 | Bar-Ness et al. | 455/278.1 |
| 2007/0211813 A1 * | 9/2007 | Talwar et al. | 375/267 |
| 2007/0263857 A1 * | 11/2007 | Sharon et al. | 379/416 |

OTHER PUBLICATIONS

C.W. Schenk et al "On the Influence of Phase Noise Induced ICI in MIMO OFDM Systems" Aug. 2005, IEEE.*
Stamoulis et al. "Intercarrier Interference in MIMO OFDM", Nov. 2002, IEEE.*
Petrovic et al. "Intercarrier Interference due to Phase Noise in OFDM—Estimation and Suppression", IEEE, Apr. 2005.*
Paulraj et al. "An Overview of MIMO Communications—A Key to Gigabit Wireless", Proceedings of the IEEE, vol. 92, No. 2, pp. 198-218, Feb. 2004.

* cited by examiner

*Primary Examiner* — Sophia Vlahos

(57) ABSTRACT

Systems and methods are provided for whitening noise of a received signal vector in a multiple-input multiple-output (MIMO) transmission or storage system. The whitening filter may be designed to whiten an interference component of the received signal vector, where the interference component is derived from modeling transmitter and receiver imperfections as a first coupling between MIMO transmitter outputs and a second coupling between MIMO receiver. The whitening filter may be computed based on the covariance matrix of the interference component.

42 Claims, 19 Drawing Sheets

$$Y_k = H_k \tilde{X}_k + \sum_{m \neq k} \beta_{k,m} \tilde{Y}_m + N_k$$

$$= H_k \left( X_k + \sum_{l \neq k} \alpha_{k,l} X_l \right) + \sum_{m \neq k} \beta_{k,m} H_m \left( X_m + \sum_{l \neq m} \alpha_{m,l} X_l \right) + N_k$$

$$= \underbrace{\left( H_k + \sum_{m \neq k} \beta_{k,m} H_m \alpha_{m,l} \right) X_k}_{\text{Intended signal} \; 602} + \underbrace{\sum_{l \neq k} \left( \alpha_{k,l} H_k + \beta_{k,l} H_l + \sum_{m \neq l, m \neq k} \beta_{k,m} H_m \alpha_{m,l} \right) X_l}_{\text{Interference Term} \; 604} + \underbrace{N_k}_{\substack{\text{Spatially} \\ \text{White} \\ \text{Noise} \; 606}}$$

INTERFERENCE WHITENING FILTERS FOR MIMO MAXIMUM LIKELIHOOD RECEIVERS

CROSS-REFERENCE TO RELATED APPLICATIONS

This claims the benefit under 35 U.S.C. §119(e) of U.S. Provisional Application Nos. 60/867,488, filed Nov. 28, 2006, and 60/868,440, filed Dec. 4, 2006 which are hereby incorporated herein by reference in their entirety.

BACKGROUND OF THE INVENTION

The disclosed technology relates generally to whitening filters, and more particularly to whitening filters for signal vectors obtained from a multiple-input multiple-output (MIMO) transmission or storage system.

With the continuing demand for higher-speed digital communications systems and higher-density digital storage systems, various techniques have been applied to increase the capacity of these systems. However, even with high-capacity communications and storage media, their respective bandwidths and densities are still limited. Therefore, MIMO systems are often used to fully exploit the capabilities of these systems. In particular, increasing the dimensions of these systems enables higher throughput and reliability, as more information can be conveyed without increasing the bandwidth of the system.

However, due to noise and device imperfections, interpreting information received from a MIMO transmission system or read from a MIMO storage system is a difficult task. Thus, interpreting this information may often result in detection errors even for the highest complexity and most powerful detection algorithms. Therefore, it would be desirable to mitigate the effect of device imperfections to improve detection performance in MIMO transmission and storage systems.

SUMMARY OF THE INVENTION

Accordingly, systems and methods are provided for whitening noise components of a signal vector that are caused by MIMO transmitter and/or MIMO receiver imperfections.

A MIMO transmission system can include a MIMO transmitter and a MIMO receiver. The MIMO transmitter can transmit digital information to the MIMO receiver through a channel via a signal vector. In some embodiments, the MIMO transmitter can convert the digital information into signals capable of being transmitted through the channel using orthogonal frequency-division multiplexing (OFDM), where each antenna of the MIMO transmitter can transmit part of the digital information using a plurality of subcarriers. Thus, the MIMO transmitter can viewed as not only having a plurality of spatial outputs (e.g., transmit antennas), but also a plurality of frequency-based outputs (e.g., subcarriers). Likewise, the multiple inputs of the MIMO receiver can be viewed as not only having a plurality of spatial inputs (e.g., receive antennas), but also a plurality of frequency-based inputs (e.g., subcarriers).

In some embodiments, to accurately interpret the signal vector transmitted from the MIMO transmitter, the MIMO receiver may include a whitening filter and a detector/decoder. The whitening filter can whiten any noise components of a signal vector received from a MIMO transmitter such that the resulting signal vector ideally has only spatially white (i.e., independent) noise components. The detector/decoder may be, for example, a maximum-likelihood decoder, and can attempt to recover the information transmitted by the MIMO transmitter using the whitened signal vector.

The whitening filter included in the MIMO receiver may be designed to whiten an interference term of a received signal vector. The interference term can represent the effect of device imperfections, such as transmitter phase noise and receiver phase noise that cause interference or cross-talk between, for example, orthogonal subcarriers in an OFDM transmission scheme. The interference term may be obtained by modeling device imperfections as a first coupling between the outputs (e.g., subcarrier outputs) of the MIMO transmitter and a second coupling between the inputs (e.g., subcarrier inputs) of the MIMO receiver. Thus, the signals that are used by the MIMO receiver to interpret transmitted information may be assumed to have been affected by a non-white, signal-dependent noise component caused by the transmitter-side and receiver-side coupling.

Using this transmitter-side and receiver-side coupling model for device imperfections, the interference component (or interference term) of a received signal can be identified. The whitening filter of the MIMO receiver can be configured to whiten the identified interference term, where the coefficients of the whitening filter can be based on the covariance matrix of the interference term. In some embodiments, the coefficients may be obtained by computing the inverse square root of the covariance matrix. In other embodiments, the coefficients may be obtained by first factoring the covariance matrix using a Cholesky factorization and computing the inverse of the resulting factor.

The interference term may be based on transmitter interference information that is associated with a particular MIMO transmitter or on the operating mode of the transmitter. For example, different MIMO transmitters may be used with the MIMO receiver, and these MIMO transmitters may cause differing amounts of interference amongst its subcarriers. The interference term may also be based on receiver interference information associated with the receiver or on the operating mode of the receiver. For example, the receiver may operate at different speeds that cause differing amounts of receiver input interference.

The transmitter and receiver interference information used to obtain the interference term, and therefore the whitening filter coefficients, can be predetermined and loaded into a storage module in the MIMO receiver. Thus, the MIMO receiver can recall the interference information from the storage module to compute the whitening filter coefficients. In some embodiments, the information stored in the storage module and used to compute whitening filter coefficients may be adaptively adjusted during operation of the receiver in order to improve the performance of the system.

In some operating scenarios, the MIMO receiver may not recognize the particular MIMO transmitter that information is being transmitted from. In this case, the MIMO receiver does not have transmitter interference information associated with the transmitter, and can compute the whitening filter coefficients based on only the receiver interference information. In particular, the receiver can obtain an interference term based on only a receiver-side coupling model, and can compute the whitening filter coefficients based on the covariance matrix of this interference term.

BRIEF DESCRIPTION OF THE DRAWINGS

The above and other aspects and advantages of the invention will be apparent upon consideration of the following detailed description, taken in conjunction with the accompanying drawings, in which like reference characters refer to like parts throughout, and in which:

FIG. 6 shows an illustrative mathematical model of a received signal vector;

DETAILED DESCRIPTION OF THE INVENTION

Figure 1:
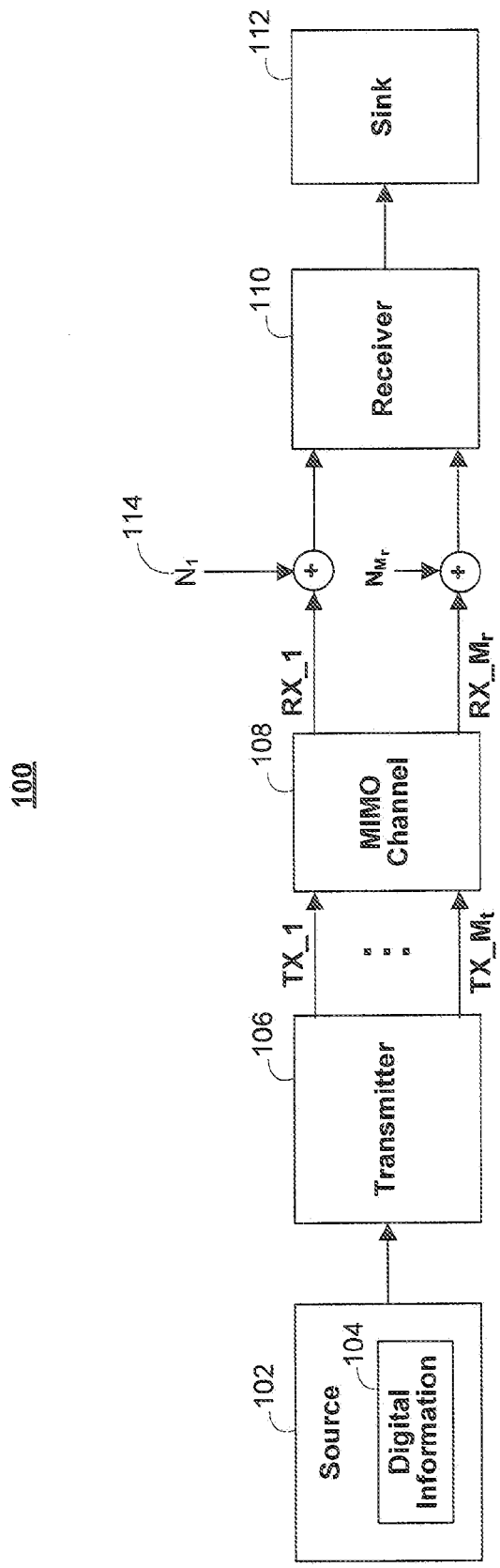
FIG. 1 shows a simplified block diagram of a multiple-input, multiple-output (MIMO) system.

FIG. 1 shows illustrative system 100 of a basic multiple-input multiple-output (MIMO) digital communications or storage system in accordance with an embodiment of the present invention. System 100 can include source 102, transmitter 106, receiver 110 and sink 112. System 100 can convey information, including digital information 104, from source 102 to sink 112 using transmitter 106 and receiver 110. Digital information 104 can represent any type of information to be conveyed to sink 112, such as a sampled/quantized version of an analog signal or binary information. Digital information 104 may be provided or generated by source 102, where source 102 may be any suitable type of digital information source including, but not limited to, a source encoder, a magnetic storage device (e.g., a hard disk), an electrical storage device (e.g., FLASH memory or RAM), or an optical storage device (e.g., a CD-ROM).

The information transferred from source 102 to sink 112 may travel through some transmission or playback medium. This medium is illustrated as channel 108 in FIG. 1. Channel 108 can represent any transmission or storage medium or media, and can alter information being transmitted through it. In addition, the information transmitted from source 102 may be affected by additive noise 114 (described below). Thus, transmitter 106 and receiver 110 can be used to accurately transfer information through the channel 108 with additive noise 114. In particular, transmitter 106 can convey digital information 104 in a manner appropriate for transmission through channel 108, and receiver 110 can interpret received information based on, for example, the properties of channel 108.

Transmitter 106 may be any suitable device or a component within a device, and may include any suitable hardware, software, or firmware for providing digital information. Transmitter 106 can have a plurality of spatial outputs (e.g., antennas) for transmitting information. In some embodiments, transmitter 106 can transmit digital information 104 using spatial multiplexing. For example, transmitter 106 can separate digital information 104 into a plurality of different information sequences, referred to as "streams," and can transmit each stream using a different transmit antenna. For simplicity, the variable $M_t$ will hereinafter represent the number of transmitter spatial outputs, and the variable Rs will hereinafter represent the number of transmitter spatial streams. In some embodiments, transmitter 106 may separate digital information sequence 102 into Rs=$M_t$ streams, and may transmit these steams via transmitter antennas TX_1, ..., TX_$M_t$.

With continuing reference to FIG. 1, transmitter 106 may include one or more modulators for converting the $M_t$ data streams into signals capable of being transmitted through channel 108. The one or more modulators can be based on any suitable modulation scheme, such as pulse amplitude modulation (PAM), quadrature amplitude modulation (QAM), or phase shift keying (PSK). In some embodiments, transmitter 106 may modulate the transmit streams using a technique referred to as orthogonal frequency-division multiplexing (OFDM). In these embodiments, the one or more modulators may transmit the data streams using multiple, orthogonal subcarriers. For example, for the first spatial output, TX_1, of transmitter 106, one of the data streams can be further divided into separate data streams and transmitted in different subcarriers. Therefore, transmitter 106 can output not only a plurality of spatial signals, but a plurality of frequency-based signals. For simplicity in describing embodiments of the present invention, a transmitter subcarrier output will hereinafter be referred to simply as an output. To distinguish spatial outputs from subcarrier outputs, a spatial output of a transmitter (e.g., TX_1) will hereinafter be referred to as a transmit antenna.

Transmitter 106 may include additional components for processing digital information 104. For example, transmitter 106 may include one or more encoders (e.g., CRC, LDPC, Turbo, Reed-Solomon, convolutional, or block codes), which may be used to encode digital information 104 and/or to the encode the $M_t$ streams individually. Transmitter 106 may also include one or more interleavers in addition to or instead of the encoders.

Receiver 110 may be any suitable device or a component within a device, and may include any suitable hardware, software, or firmware for receiving and interpreting signals. Receiver 110 can have a plurality of spatial inputs (e.g., receive antennas) for receiving information. For simplicity, the variable, $M_r$, will hereinafter represent the number of spatial inputs at receiver 110, referred to in FIG. 1 as inputs RX_1, ..., RX_$M_r$. These spatial inputs of receiver 110 will hereinafter be referred to as receive antennas. For OFDM transmission systems, each receive antenna may receive a plurality of frequency-based, or subcarriers, inputs. Thus, for each subcarrier, receiver 110 can include any suitable components for determining Rs transmitted data streams from the received data streams. The subcarrier inputs of a receiver will hereinafter be referred to simply as inputs. Various embodiments of receiver 110 are described below for OFDM systems in connection with FIGS. 2 and 7.

With continuing reference to FIG. 1, channel 108 may be a MIMO channel with $M_t$ inputs (obtained from the antennas of transmitter 106) and $M_r$ outputs (provided to the antennas of receiver 110), and may be referred to simply as an $M_t \times M_r$ MIMO channel. Due to channel properties, the signal received by each subcarrier input of receiver 110 (e.g., the first subcarrier input on RX_1) may be based on signals from multiple transmitter antennas (e.g., the first subcarrier output from TX_1, ..., TX_$M_t$)). In particular, the kth subcarrier of the signal received by RX_i may be a linear combination of the signals provided by transmit antennas TX_1, ..., TX_$M_t$ for that subcarrier. Thus, in matrix form, system 100 can be modeled by the equations, $$Y_k = H_k X_k + N_k, \text{ and} \quad (1)$$

$$\begin{bmatrix} y_1 \\ \vdots \\ y_{M_r} \end{bmatrix}_k = \begin{bmatrix} h_{11} & \cdots & h_{1R_s} \\ \vdots & \ddots & \vdots \\ h_{M_r 1} & \cdots & h_{M_r R_s} \end{bmatrix}_k \begin{bmatrix} x_1 \\ \vdots \\ x_{R_s} \end{bmatrix}_k + \begin{bmatrix} N_1 \\ \vdots \\ N_{M_r} \end{bmatrix}_k. \quad (2)$$

Here, equation (2) is an expanded version of equation (1), where $Y_k$ is an $M_r$-dimensional signal vector associated with the kth subcarrier, and where the components of the vector represent the signals received by the $M_r$ inputs of receiver 110. $H_k$ is an $M_r \times$Rs matrix associated with the kth subcarrier and represents the effect of channel 108 on a transmitted signal vector, and may be referred to as a channel response matrix. $X_k$ is an Rs-dimensional signal vector representing the Rs spatial data streams transmitted by the $M_t$ transmit antennas of transmitter 106 on the kth subcarrier, and $N_k$ is an $M_r$-dimensional signal vector representing additive noise 114 on the kth subcarrier. Equations (1) and (2) will be illustrated in detail in FIGS. 3-5.

Additive noise 114 can have any suitable characteristics and can be noise that is not correlated to the signals being transmitted. In some embodiments, each component of noise 114 may be modeled by receiver 110 as additive white Gaussian noise (AWGN) with zero mean and a variance of $\sigma^2$. In these embodiments, the noise affecting each channel output can have a conditional probability distribution function (PDF) given by, $$AWGN_{PDF|y} = \frac{1}{\sigma\sqrt{2\pi}} \exp\left(\frac{-\|y - E[y]\|^2}{2\sigma^2}\right), \quad (3)$$

where E[y] is the value of an ideal, noiseless signal. Any noise with any other noise distribution can be assumed by receiver 110. However, for simplicity, it will be assumed that any additive noise affecting each of the $M_r$ received signals is AWGN with a distribution given by equation (3).

It should be understood that the enumeration of transmitter antennas (e.g., TX_1, ..., TX_$M_t$) and receiver antennas (e.g., RX_1, ..., RX_$M_r$) are for convenience only, and are not meant to suggest a particular ordering of the antennas. For example, it should not be assumed that the numbering is based on a spatial orientation of the various inputs/outputs, or that the enumeration suggests a relative priority of the various inputs/outputs. The enumeration of transmitter outputs and receiver inputs, similarly, does not necessarily suggest a particular ordering of subcarriers, nor a relative priority.

In one embodiment, system 100 can represent a wireless transmission system. In this embodiment, transmitter 106 may be a wireless transmitter for broadcasting information wirelessly, such as a commercial gateway modem, and can transmit information using $M_t$ wireless transmit antennas. Receiver 110 may be a wireless receiver, such as a wireless computer adapter, and can receive information wirelessly using $M_r$ wireless receive antennas. Channel 108 may include the space between the transmit antennas and receive antennas, and may include any structures within the space that may obstruct and/or attenuate the transmitted signals. For example, channel 108 may be a wireless transmission channel that alters the transmitted signals due to, among other things, multi-path fades and shadowing effects.

Figure 2:
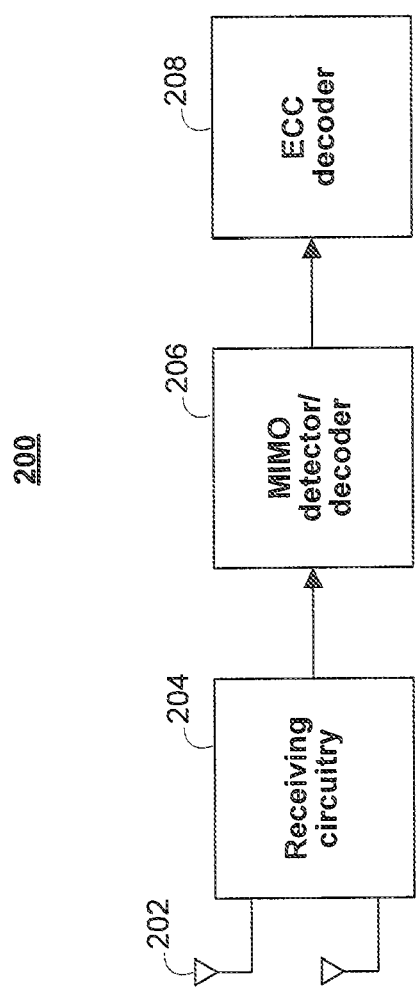
FIG. 2 shows a simplified block diagram of a MIMO receiver.

Referring now to FIG. 2, an illustrative block diagram of receiver 200 is shown in accordance with an embodiment of the present invention. Receiver 200 can be a more detailed view of receiver 110 of FIG. 1, and can include antennas 202, receiving circuitry 204, MIMO detector/decoder 206, and error correction code (ECC) decoder 208. Each of antennas 202 can be any suitable type of antenna (e.g., wireless antenna) or other spatial input mechanism for receiving a signal from a channel (e.g., channel 108 of FIG. 1). Antennas 202 may be coupled to receiving circuitry 204. Receiving circuitry 204 may include any suitable processing or adaptor circuitry for converting the signals received from antennas 202 to signals that can be detected by MIMO detector/decoder 206. Receiving circuitry 204 may include, for example, one or more FIβ filters.

MIMO detector/decoder 206 may interpret the signals received from antennas 202. As described above, for each subcarrier, due to crosstalk and other properties of a channel (e.g., channel 108 of FIG. 1), each signal received from antenna 202 may be based on information from multiple transmit spatial streams. MIMO detector/decoder 206 can attempt to demultiplex and demodulate these signals to obtain the original Rs transmit streams.

MIMO detector/decoder 206 can estimate the transmitted sequences using a suitable detection algorithm. In some embodiments, detector/decoder 206 can implement a maximum-likelihood decoding (ML) algorithm. In these embodiments, detector/decoder 206 may be a Viterbi detector or decoder. ML decoding may produce a detected bit stream that has the highest probability of being the actual transmitted bit stream. To perform ML decoding, detector/decoder 206 may compute, $$\hat{X} = \arg\min_s \|Y_k - H_k s\|^2. \quad (4)$$

In equation (4), $\hat{X}$ may be the detection decision, which may be referred to as the estimated transmit signal vector, provided by detector/decoder 206. $Y_k$ may be the signal vector received from antennas 202 on the kth subcarrier, $H_k$ may be the channel response matrix for the transmission or storage medium that is associated with the with kth subcarrier, and s is the set of different possible values of the transmitted signal vector. As illustrated by equation (4), ML decoding may involve performing vector decoding on the received signal vector, and may consider the entire received signal vector when making detection decisions, rather than, for example, decoding each component of a signal vector independently.

Although some embodiments of MIMO detector/decoder 206 are described in terms of ML decoding, it should be understood that this is merely illustrative. Detector/decoder 206 may implement any other suitable detection algorithm, such as zero-forcing or minimum mean squared error, without departing from the scope of the invention. Also, it should be understood that detector/decoder 206 may be either produce soft information or hard information. For example, detector/decoder 206 can be a soft-output ML decoder or a hard-output ML decoder.

With continuing reference to FIG. 2, ECC decoder 208 of receiver 200 may be coupled to the output of MIMO detector/decoder 206, and can decode the data sequence provided by MIMO detector/decoder 206. Using the information from detector/decoder 206, ECC decoder 208 may produce an estimate of the originally transmitted or stored information (e.g., digital information 104 of FIG. 1). ECC decoder 208 may be a decoder based on the error-correcting or error-detecting code used by the corresponding transmitter in the system (e.g., transmitter 106 of FIG. 1). For example, if the transmitter includes an LDPC encoder, ECC decoder 208 may be an LDPC decoder. In this way, ECC decoder 208 can remove the redundancy added by the encoder, and can correct or detect any errors that may remain after signal detection by MIMO detector/decoder 206.

In some embodiments, MIMO detector 206 may make detection decisions based on predetermined knowledge of the channel (e.g., predetermined knowledge of a channel response matrix) and assuming AWGN. This may provide high performance if an ideal transmitter and receiver could be implemented. An ideal transmitter and an ideal receiver may refer to a transmitter and receiver capable of transmitting and receiving information without adding additional noise components. However, practical MIMO transmission and storage systems are imperfect, and may introduce additional noise in the form of interference between its inputs/outputs. For example, if OFDM is used, the one or more modulators of the transmitter (e.g., transmitter 106 of FIG. 1) may introduce phase noise when up converting the data streams from base band to radio frequency. That is, the subcarriers resulting from the up conversion may not be truly orthogonal, creating interference between the transmitter output signals. Similarly, the down conversion from radio frequency to base band at the receiver-side may introduce receiver phase noise.

Figure 3:
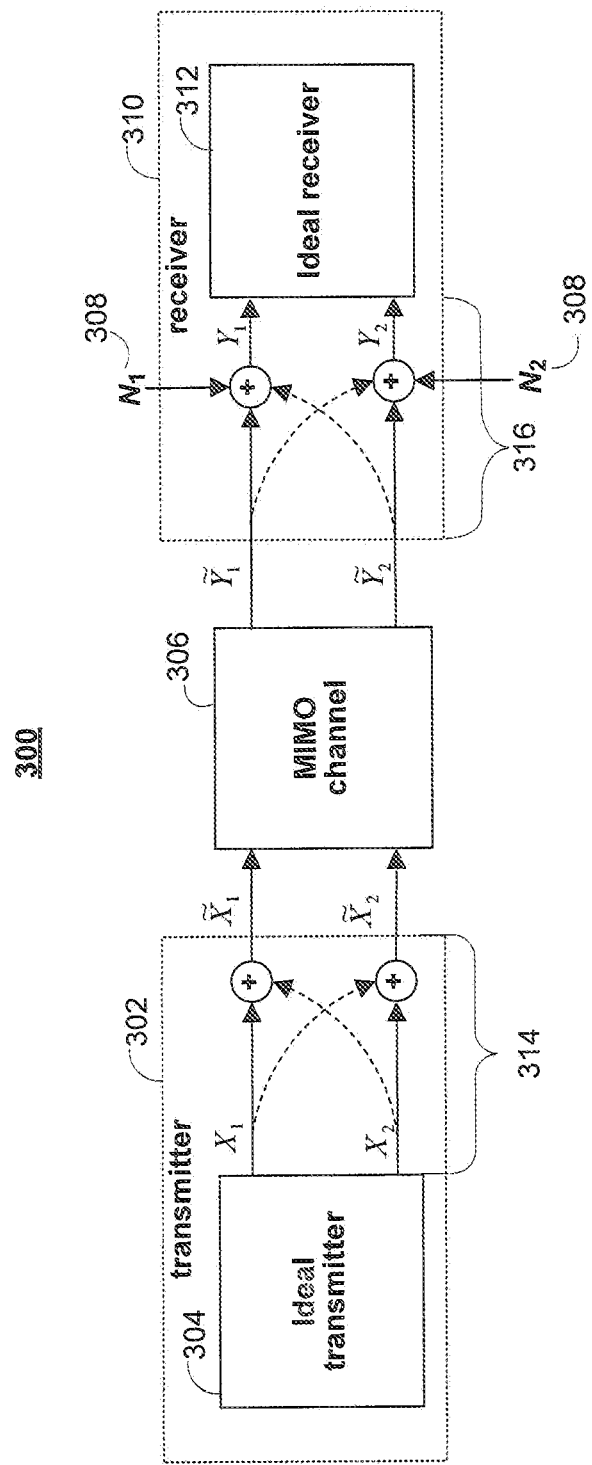
FIG. 3 shows another simplified block diagram of a MIMO system with transmitter-side and receiver-side interference.

Phase noise, and other types of transmitter or receiver imperfections, may be modeled as a coupling between transmitter outputs and/or a coupling between receiver inputs. This is illustrated in FIG. 3, which shows an illustrative block diagram of transmission or storage system 300. System 300 may represent a transmission or storage system implementing OFDM with two subcarriers, although systems with different dimensions and different modulation schemes may be contemplated.

System 300 may have similar components as those shown above in system 100, such as a transmitter and receiver identified in FIG. 3 as transmitter 302 and receiver 310. Transmitter 302 and receiver 310 can include any of the features and functionalities of their corresponding components in FIG. 1. For example, like their corresponding components in FIG. 1, transmitter 302 and receiver 310 can be used to transfer information through MIMO channel 306. However, in this figure, as well as in FIGS. 4 and 5, and unlike in FIG. 1, the outputs of transmitter 302 illustrate subcarrier outputs rather than spatial outputs. Similarly, the inputs of receiver 310 illustrate subcarrier inputs rather than spatial inputs. That is, while in FIG. 1 each line departing from transmitter 106 illustrates a signal with a plurality of subcarriers that is transmitted from one transmit antenna, each line departing from transmitter 302 illustrates signals transmitted from a plurality of transmit antennas on one subcarrier.

Transmitter 302 may represent a practical MIMO transmitter. Transmitter 302 may be modeled as an ideal transmitter, identified as ideal transmitter 304, and a coupling 314 of the outputs (e.g., subcarriers) of ideal transmitter 304. Given a bit sequence for transmission (e.g., digital information 104 of FIG. 1), transmitter 302 may modulate the bit sequence with the intention of producing signals $X_1$ and $X_2$, on a first and second subcarrier, respectively. However, these signals may not correspond to the signals that are actually provided to MIMO channel 306. Due to device imperfections (e.g., transmitter phase noise), transmitter 302 may actually produce signals $\tilde{X}_1$ and $\tilde{X}_2$ at its outputs. Each actual signal may be a combination of the signals that were meant for different outputs. One way to model the effect of transmitter output coupling 314 will be described in greater detail below in connection with FIG. 4.

Because $\tilde{X}_1$ and $\tilde{X}_2$ are transmitted through channel 306, the signals provided to MIMO receiver 310 include not only the intended information from transmitter 302, but also the interference added by transmitter output coupling 314. These signals, which may also be altered by MIMO channel 306, can be referred to as signals $\tilde{Y}_1$ and $\tilde{Y}_2$. Receiver 310 may represent a practical MIMO receiver that receives these signals, and can add noise or interference of its own when interpreting the information in the signals (e.g., from phase noise). Thus, receiver 310 may be modeled as an ideal receiver, identified as ideal receiver 312, and a coupling 316 of the inputs of ideal receiver 312. Receiver input coupling 316 may represent any device imperfections, such as receiver phase noise, and may add additional crosstalk or interference between the received signals. One way to model the effect of receiver input coupling 316 will be described in greater detail below in connection with FIG. 5.

The signals obtained by ideal receiver 310 are shown in FIG. 3 as signals $Y_1$ and $Y_2$. For each of these signals, in addition to carrying the information that is meant to be carried on that signal, each signal may also include additional noise due to transmitter output coupling 314, spatially white additive noise 308 (e.g., AWGN), and receiver input coupling 316. In some embodiments, the detector of ideal receiver 310 may make detection decisions using a technique that is effective for interpreting signals affected by only AWGN. This type of detector is described above in connection with FIG. 2, which illustrates a detector/decoder that directly detects/decodes a signal received from the channel using, for example, ML decoding. However, in some operating conditions, because AWGN is not the only noise affecting transmission/storage system 300, a detector that interprets signals based on only AWGN may have poor performance. In fact, as described below in connection with FIGS. 4 and 5, the effect of transmitter output coupling (e.g., transmitter output coupling 314) and receiver input coupling (e.g., receiver input coupling 316) can be significant.

Figure 4:
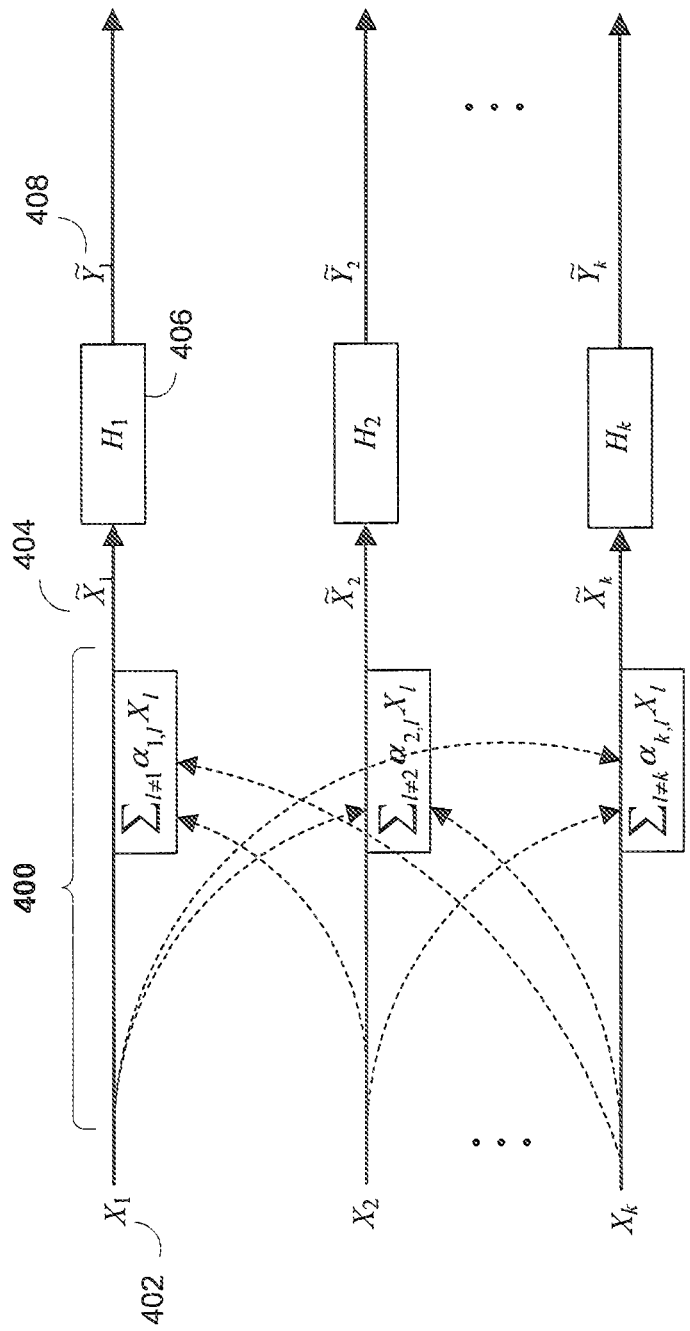
FIG. 4 shows a more detailed, yet still simplified, diagram of transmitter-side interference.

Referring now to FIG. 4, a more detailed, yet still simplified, view of transmitter-side coupling is illustrated. Transmitter coupling 400 is a more detailed view of coupling 314 in FIG. 3 generalized for any suitable number of transmit outputs. For simplicity, the transmitter-side coupling illustrated in FIG. 4 will be described for a first transmitter output (e.g., the first subcarrier). However, it should be understood that the description may apply similarly to the other outputs of the MIMO transmitter.

Signal 402 may be the signal that a transmitter (e.g., transmitter 106 of FIG. 1 or transmitter 302 of FIG. 3) intends to transmit via the first transmitter output. The actual signal transmitted at this output, however, is shown as signal 404. Actual signal 404 may be modeled as a combination (e.g., a linear combination, a nonlinear combination, etc.) of the signals that were meant for different transmitter outputs. The mathematical model of actual signal 404 may be given by, $$\tilde{X}_1 = X_1 + \sum_{l \neq 1} \alpha_{1,l} X_l, \tag{5}$$

where $X_i$ is the signal meant for the ith transmitter output and $\alpha_{k,l}$ is a transmitter weighting factor signifying the leakage of the lth intended signal at the kth output. Weighting factor $\alpha_{k,l}$ may also be referred to as transmitter-side interference information. Using OFDM system as an example, the transmitter weighting factor may indicate the relative amount of energy leakage from another subcarrier. For example, a large weighting factor may indicate a greater interference or energy leakage from the other subcarrier.

With continuing reference to FIG. 4, due to transmitter-side coupling, the actual signal obtained at the first input of a receiver (e.g., receiver 310 of FIG. 3), or signal 408, may be given by, $$\tilde{Y}_1 = H_1 \tilde{X}_1 \tag{6}$$

$$= H_1 \left( X_1 + \sum_{l \neq 1} \alpha_{1,l} X_l \right). \tag{7}$$

In equations (6) and (7), $H_1$, which is also identified in FIG. 4 as channel 406, may represent the effect of a MIMO channel on the transmitted signal. $H_1$ is a $M_t \times M_r$ channel matrix associated with the first subcarrier, such as the channel response matrix in equations (1) and (2) above for k=1. Thus, as illustrated by equation (7), signal 408 that is actually obtained by the receiver includes both the signal, $X_1$, meant for transmission through the first output, affected by a channel $H_1$, and a transmitter interference term, $$\sum_{l \neq 1} \alpha_{1,l} X_l,$$

also affected by the channel. Additional noise (e.g., interference) may then be added by receiver imperfections, as illustrated in FIG. 5.

Figure 5:
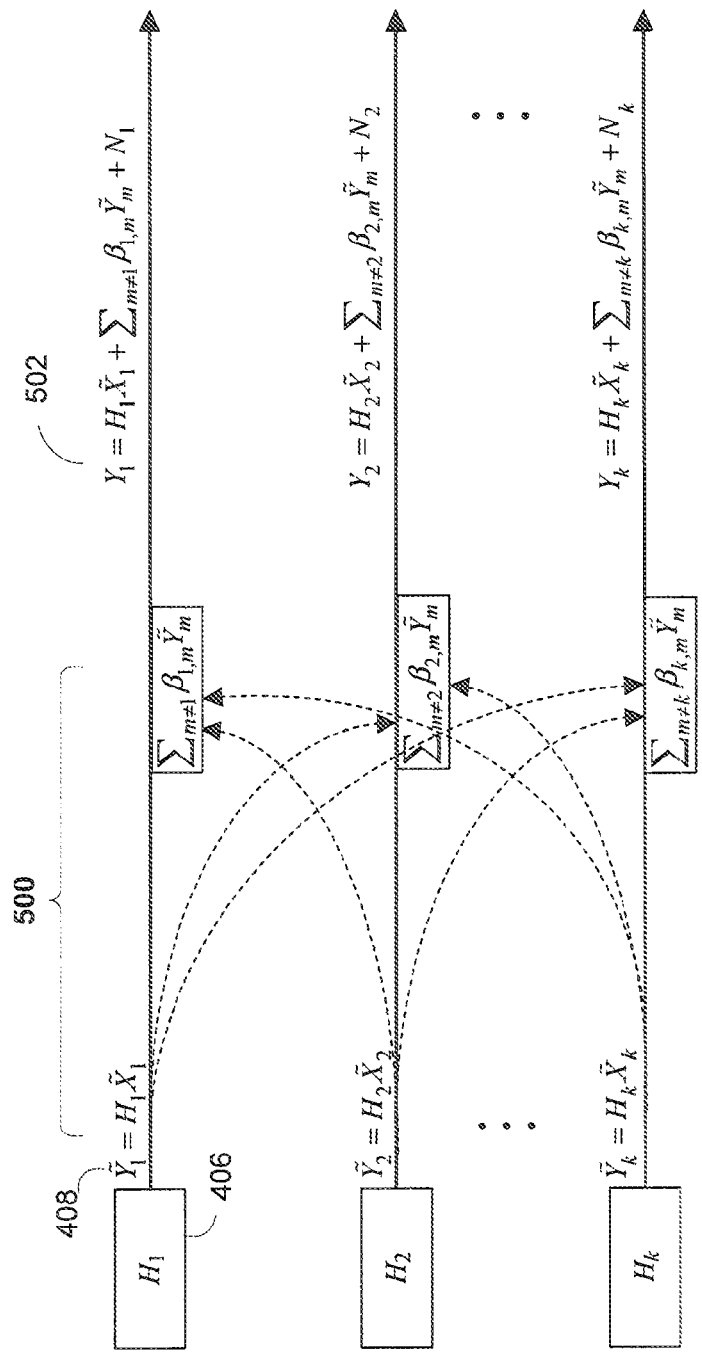
FIG. 5 shows a more detailed, yet still simplified, diagram of receiver-side interference.

FIG. 5 shows a more detailed, yet still simplified, view of receiver-side coupling. Receiver coupling 500 is a more detailed view of coupling 316 in FIG. 3, and is generalized for any suitable number of MIMO receiver inputs. For simplicity, the receiver-side coupling illustrated in FIG. 5 will be described for the first receiver input. However, it should be understood that the description may apply similarly to the other inputs of the MIMO receiver.

Due to receiver imperfections, such as phase noise, the actual signal used by the receiver to make detection decisions is different from the signal received on the first subcarrier from channel 406. In particular, actual signal 502 used by the receiver in making detection decisions may include some degree of interference from signals intended for other subcarriers. Thus, the actual signal may be modeled as a combination (e.g., a linear combination or nonlinear combination) of the signals provided by the channel.

Mathematically, actual signal 502 used by the receiver for interpreting transmitted information may be, $$Y_1 = \tilde{Y}_1 + \sum_{m \neq 1} \beta_{1,m} H_m \tilde{Y}_m + N_1 \tag{8}$$

$$= H_1 \left( X_1 + \sum_{l \neq 1} \alpha_{1,l} X_l \right) + \sum_{m \neq 1} \beta_{1,m} H_m \left( X_m + \sum_{l \neq m} \alpha_{m,l} X_l \right) + N_1, \tag{9}$$

where $\tilde{Y}_m$ is the signal received on the mth subcarrier, $\beta_{k,m}$ is a receiver weighting factor signifying the leakage from the mth subcarrier into the kth subcarrier at the receiver, and $N_1$ is the spatially white noise vector. The spatially white noise component may be AWGN, and can have any of the characteristics described above in connection with noise 114 of FIG. 1. A large weighting factor indicates a greater interference or energy leakage from the other subcarrier. Weighting factor $\beta_{k,m}$ may also be referred to as receiver-side interference information.

The value of weighting factors, $\alpha$ and $\beta$, used by a receiver may be dependent on a variety of different factors, including, but not limited to, the type of modulation used, the speed/density of transmission/storage, the type or brand of transmitter/receiver, and the materials used to create the transmitter/receiver. Each transmitter or receiver may also be associated with multiple values of $\alpha$ and $\beta$ if, for example, the transmitter or receiver has multiple operating modes or settings (e.g., multiple modulation settings, multiple data rate settings).

Equation (9) may be rewritten as shown in FIG. 6 for the kth receiver input. The final equation of FIG. 6 may be derived as follows in Sequence 1:

Sequence 1

$$Y_k = H_k \left( X_k + \sum_{l \neq k} \alpha_{k,l} X_l \right) + \sum_{m \neq k} \beta_{k,m} H_m \left( X_m + \sum_{l \neq m} \alpha_{m,l} X_l \right) + N_k$$

$$= H_k X_k + \sum_{l \neq k} \alpha_{k,l} H_k X_l + \sum_{m \neq k} \beta_{k,m} H_m X_m + \sum_{m \neq k} \beta_{k,m} H_m \sum_{l \neq m} \alpha_{m,l} X_l + N_k$$

$$= H_k X_k + \sum_{l \neq k} (\alpha_{k,l} H_k + \beta_{k,l} H_l) X_l + \sum_{m \neq k} \beta_{k,m} H_m \sum_{l \neq m} \alpha_{m,l} X_l + N_k$$

$$= H_k X_k + \sum_{l \neq k} (\alpha_{k,l} H_k + \beta_{k,l} H_l) X_l + \sum_l \left( \sum_{m \neq l, m \neq k} \beta_{k,m} H_m \alpha_{m,l} \right) X_l + N_k$$

$$= \left( H_k + \sum_{m \neq k} \beta_{k,m} H_m \alpha_{m,l} \right) X_k + (Intf + N_k)$$

$$Intf = \sum_{l \neq k} \left( \alpha_{k,l} H_k + \beta_{k,l} H_l + \sum_{m \neq l, m \neq k} \beta_{k,m} H_m \alpha_{m,l} \right) X_l$$

Thus, the kth signal can be represented by intended signal 602, interference term 604, and spatially white component 606. Intended signal 602 is the information bearing desired signal. That is, intended signal 602 includes primarily the information that the MIMO transmission system intends to transfer to the receiver on that subcarrier. Spatially white noise component 606 may be the white Gaussian noise added to the signal during transmission through the channel. Interference term 604, also shown in Sequence 1 as Intf, is the component of the received signal caused by the transmitter-side and receiver-side coupling model shown in FIGS. 4 and 5. Depending on the degree of interference (e.g., the magnitude of the αs and βs), interference term 604 may constitute a large portion of the signal. If phase noise or other types of interferences causing this coupling are not considered in detection decisions, the performance of the receiver may be degraded. Therefore, as will be described in greater detail below, some embodiments of the present invention may include systems and methods for whitening the interference term (e.g., interference term 604) resulting from transmitter-side and/or receiver-side coupling. This may allow a maximum-likelihood detector/decoder, or any other suitable decoder, to retain its high performance.

Figure 7:
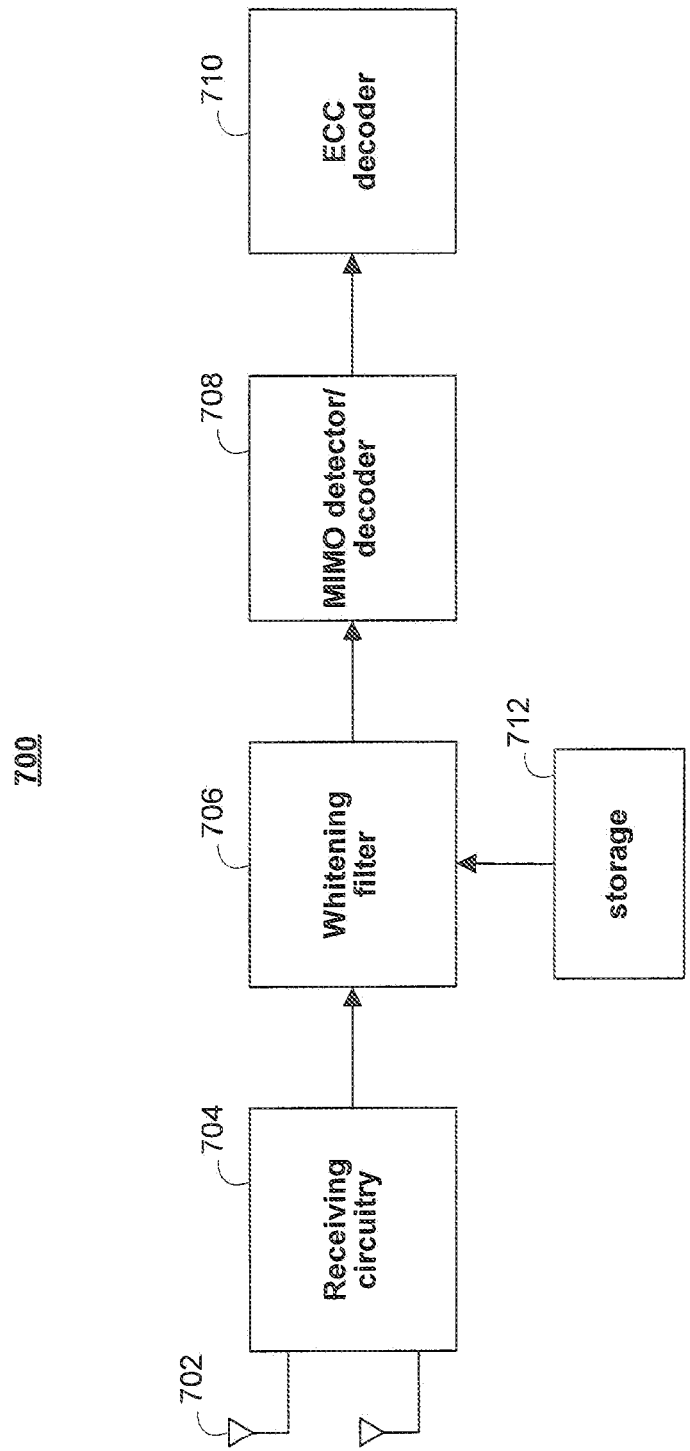
FIG. 7 shows a simplified diagram of a MIMO receiver with a whitening filter.

A receiver capable of whitening an interference term of a received signal is illustrated in FIG. 7. Receiver 700 of FIG. 7 can include antennas 702, receiving circuitry 704, whitening filter 706, storage 712, MIMO detector/decoder 708, and ECC decoder 710. Receiver 700 includes many similar components as receiver 200 discussed above in connection with FIG. 2, and these components may have any of the features and functionalities of their corresponding components in FIG. 2.

Like receiving circuitry 204 of FIG. 2, receiving circuitry 704 of FIG. 7 may convert signals obtained by antennas 702 to signals capable of being interpreted by MIMO detector/decoder 708. During this conversion, receiver input coupling, such as the coupling described in connection with FIG. 5, may occur. Thus, the signal obtained by whitening filter 706 may have properties that are similar to signal 600 of FIG. 6. In particular, the signal obtained by whitening filter 706 may be affected by an interference term. Whitening filter 706 may whiten the interference term of this signal such that any noise affecting the resulting signal is spatially white. That is, whitening filter 706 may convert a signal with the properties of signal 600 to a signal given by, $$\tilde{Y}_1 = W_1 Y_1 \quad (10)$$

$$= \tilde{H}_1 X_1 + N_{TOTAL}, \quad (11)$$

where $\hat{H}_1$ is an effective channel matrix, and $N_{TOTAL}$ is the whitened composite interference and noise component Therefore, because the signal vector given by equation (11) is affected by only white noise, it may be effectively decoded by detector/decoder 708 using a maximum-likelihood decoding algorithm. To perform ML decoding, detector/decoder 708 may compute, $$\hat{X} = \arg\min_{s} \|Y_k - \hat{H}_k s\|^2. \quad (12)$$

With continuing reference to FIG. 7, whitening filter 706 may filter a received signal based on a matrix, $F_k^{-1/2}$, the inverse square root of $F_k$, which is the covariance matrix of interference term 604 (FIG. 6). This type of filter may produce a signal with the properties of equation (11). The covariance matrix may be given by, $$F_k = \sum_{l \neq k} (\alpha_{k,l} H_k + \beta_{k,l} H_l)(\alpha_{k,l} H_k + \beta_{k,l} H_l)^H + \quad (13)$$

$$\sum_{l \neq k} (\alpha_{k,l} H_k + \beta_{k,l} H_l)\left(\sum_{m \neq l, m \neq k} \beta_{k,m} H_m \alpha_{m,l}\right)^H +$$

$$\sum_{l \neq k} \left(\sum_{m \neq l, m \neq k} \beta_{k,m} H_m \alpha_{m,l}\right)(\alpha_{k,l} H_k + \beta_{k,l} H_l)^H +$$

$$\sum_{l \neq k} \left(\sum_{m \neq l, m \neq k} \beta_{k,m} H_m \alpha_{m,l}\right)\left(\sum_{m \neq l, m \neq k} \beta_{k,m} H_m \alpha_{m,l}\right)^H + C,$$

where C is the covariance matrix of the noise vector. Thus, the coefficients of whitening filter 706 may be based on the weighting factors, α and β, and on the channel matrices corresponding to the various subcarriers.

The value of weighting factors α and β and channel response matrices H may be stored in storage module 712, and can be retrieved by receiver 700 to compute the whitening filter coefficients for whitening filter 706. Storage module 712 can be any suitable storage device, such as a ROM, RAM, or FLASH memory. In some embodiments, these values can be fixed, and storage module 712 may be preloaded with these values. In other embodiments, the value of α and β can be altered during the operation of receiver 700. For example, receiver 700 may adaptively update the stored values based on the detection performance of the receiver (e.g., based on the bit error rate). In other embodiments, rather than storing values for α and β, the whitening filter coefficients themselves may be stored in storage module 712.

To accommodate different operating scenarios, storage module 712 may include multiple sets of values for weighting factors α and β and channel response matrices H. Storage module 712 can include multiple values of β if, for example, receiving circuitry 704 can take on different settings that cause differing amounts of receiver-side coupling. Storage module 712 can include multiple values for α, where one or more of the values may be associated with a particular transmitter (e.g., a particular brand). Therefore, receiver 700 may be able to recognize a set of MIMO transmitters, and can whiten an interference term based on the expected properties of each MIMO transmitter. Also, storage module 712 can include multiple values for H to accommodate different types of channels or different transmission speeds/storage densities associated with a particular channel. Thus, computing filter coefficients may involve a table lookup into storage module 712 for the appropriate weighting factor values and channel response matrix.

In some operating scenarios, receiver 700 may not recognize the transmitter from which a signal vector is received. In these situations, storage module 712 does not have interference information (e.g., values of α) associated with the unrecognized transmitter. Therefore, receiver 700 may operate using different values of α to identify the value resulting in the best performance (e.g., the lowest bit error rate). Receiver 700 can then continue to operating using this value of α. Alternatively, receiver 700 can whiten an interference term that is based on only receiver-side coupling. This interference term may be derived in a similar fashion as that described above in connection with FIGS. 4 and 5. Thus, receiver 700 may have two operating modes: a first operating mode that is used when the transmitter is recognized, and a second operating mode that is used when the transmitter is unknown. The second operating mode may not be as effective as the first, because it does not take transmitter leakage into account. However, because the second operating mode does take receiver leakage into account, it may still be considerably more effective than directly decoding the received signal using maximum-likelihood decoding.

As described above, computing the whitening filter coefficients for whitening filter 706 may involve an inverse square root operation. This operation may be complex and expensive to implement. That is, the logic or circuitry needed to implement the operation may be highly resource intensive in terms of, for example, power consumption, speed, or silicon area. In some embodiments, instead of including logic or circuitry to directly perform this complex operation, the computation may be simplified by first factoring the covariance matrix using a Cholesky factorization. The Cholesky factorization of the covariance matrix produces, $$F_k = L \cdot L^H, \qquad (14)$$

where L is a lower triangular matrix. With the covariance matrix factored, the whitening filter coefficients for whitening filter 706 may be obtained by calculating the inverse of L, or $L^-$. The inverse computation can be considerably less complex than the inverse square root operation described above.

FIGS. 8-11 show illustrative flow diagrams of processes that can be performed by a MIMO receiver, such as the receivers described above in connection with FIGS. 1-3 and 7. It should be understood that these flow diagrams are merely illustrative. Any of the steps illustrated in the flow diagrams may be modified or rearranged, and any additional components may be added, without departing from the scope of the present invention.

Figure 8:
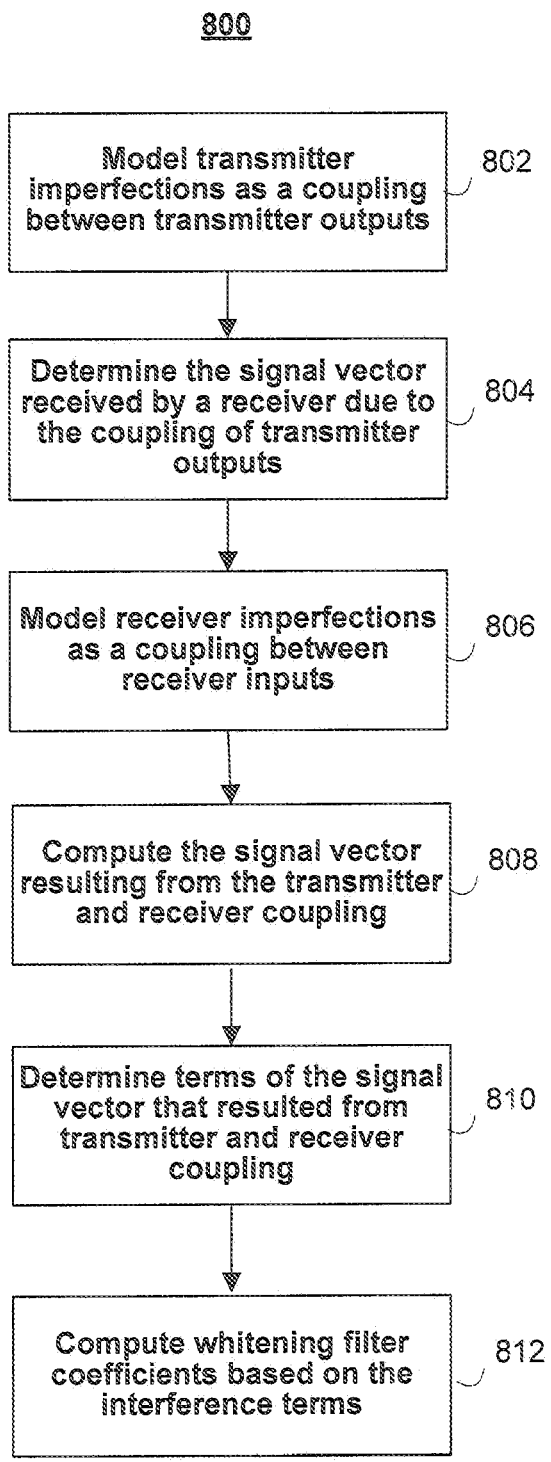
FIG. 8 shows an illustrative flow diagram for obtaining whitening filter coefficients based on transmitter-side and receiver-side coupling.

Referring now to FIG. 8, illustrative flow diagram 800 is shown for initializing and updating whitening filter coefficients for use in whitening interference caused by transmitter and receiver imperfections. At step 802, transmitter imperfections, such as phase noise, can be modeled as a coupling between transmitter outputs. The transmitter may have any of the properties of transmitter 302 (FIG. 3), and may be used to transmit information to a receiver (e.g., receiver 310 of FIG. 3). At step 804, the signal vector obtained by the receiver may be determined based on the modeled transmitter output coupling. Thus, the signal vector may include the signal intended for reception and an interference term resulting from the transmitter output coupling.

At step 806, receiver imperfections, such as receiver phase noise, can be modeled as a coupling between receiver inputs. At step 808, a model of the actual signal vector that is used by the receiver to recover the transmitted information can be determined. From the modeled signal vector, an overall interference term (e.g., interference term 604 of FIG. 6) can be derived at step 810, and whitening filter coefficients for a whitening filter may be computed based on the interference term. The whitening filter may be designed for whitening the interference term.

Figure 9:
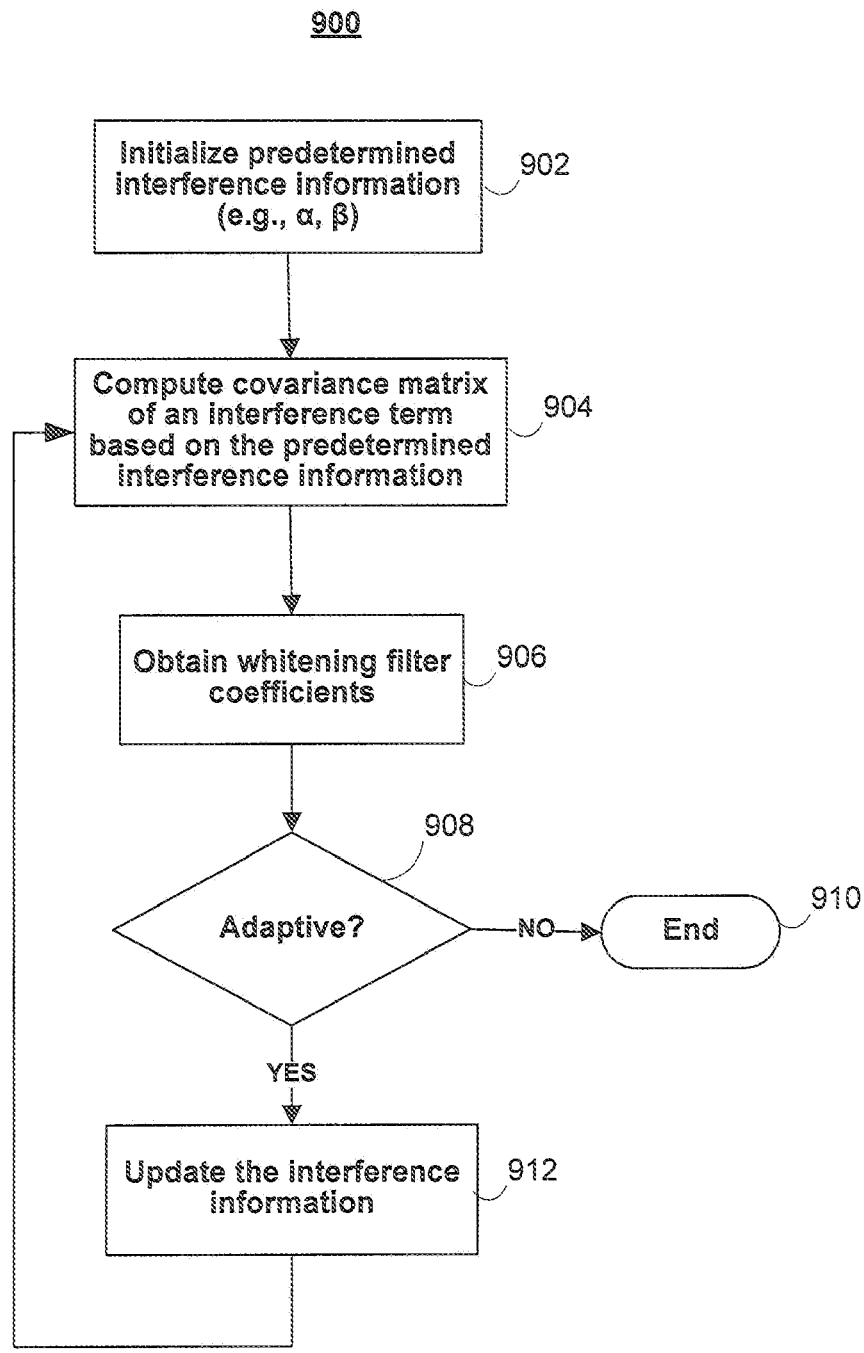
FIG. 9 shows an illustrative flow diagram for updating whitening filter coefficients.

Referring now to FIG. 9, illustrative flow diagram 900 is shown for obtaining whitening filter coefficients. At step 902, predetermined interference information (e.g., values for α and β) is initialized. The interference information can be information based on one or more of receiver-side coupling (e.g., receiver phase noise) and transmitter-side coupling (e.g., transmitter phase noise), and can be obtained from a table lookup into memory (e.g., storage module 712 of FIG. 7). At step 904, the covariance matrix of an interference term is computed, where the interference term is derived from the interference information. The interference term can be, for example, interference term 604 of FIG. 6, or any other interference term obtained by modeling the imperfections of the transmitter and receiver. At step 906, the whitening filter coefficients may be computed based on the covariance matrix of the interference term. In some embodiments, step 906 may involve computing an inverse square root of the covariance matrix.

At step 908, a determination can be made as to whether the system is adaptive. This determination can be made based on a setting or mode of operation of the system. If it is determined that the system is not in an adaptive mode, the process illustrated by flow diagram 900 can end at step 910, and the system can continue to use the whitening filter coefficients computed at step 906. If, at step 908, it is determined instead that the system is adaptive, the process can move to step 912. At step 912, the interference information initialized at step 902 (e.g., α, β, or both) may be updated. The process of flow diagram 900 may then return to step 904, where a new covariance matrix is computed based on the updated interference information and the whitening filter coefficients can be updated.

Figure 10:
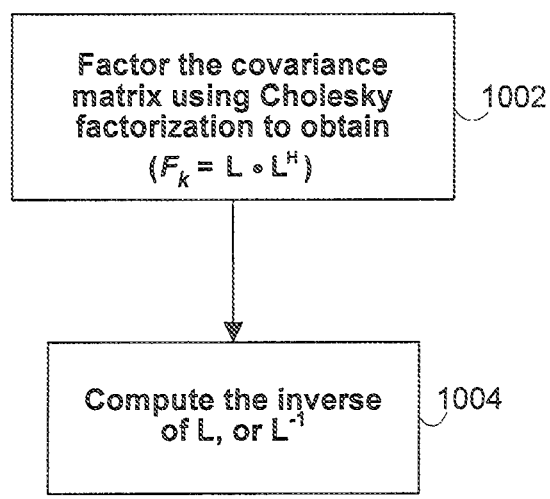
FIG. 10 shows an illustrative flow diagram for using Cholesky factorization to obtain whitening filter coefficients.

Referring now to FIG. 10, illustrative flow diagram 1000 shows more detailed steps that can be performed at step 906 (FIG. 9) for obtaining whitening filter coefficients. At step 1002, the covariance matrix of the interference term may be factored. The covariance matrix may be factored using a Cholesky factorization, which factors the covariance matrix into a lower triangular matrix and an upper triangular matrix. At step 1004, the inverse of the lower triangular matrix can be computed. The result of the computation may be used as the whitening filter coefficients for a whitening filter.

Figure 11:
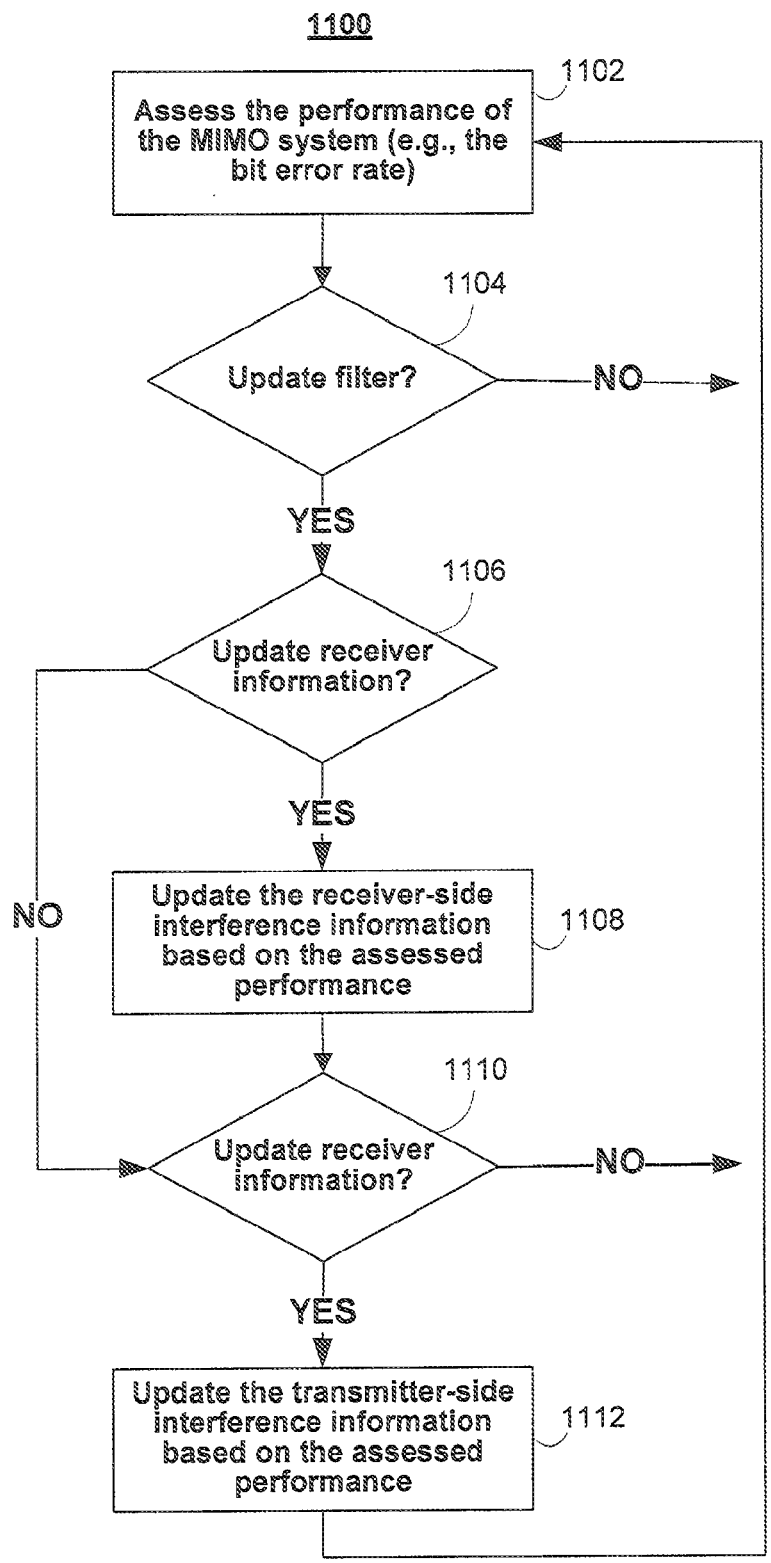
FIG. 11 shows a more detailed, yet still simplified, flow diagram for updating whitening filter coefficients.

Referring now to FIG. 11, illustrative flow diagram 1100 is shown that includes more detailed steps that can be performed at step 912 (FIG. 9) for updating interference information. At step 1102, the performance of the system (e.g., the bit error rate) may be assessed. Then, at step 1104, a determination can be made as to whether the whitening filter coefficients should be updated. This determination may involve comparing the assessed performance to a performance metric (e.g., a bit error rate metric).

If, at step 1104, it is determined that the whitening filter should not be updated, the process can return to step 1102. Otherwise, a new determination can be made at step 1106 as to whether the receiver interference information should be updated. This determination may be based on a setting or mode of operation of the system. If the receiver interference information should be updated, at step 1108, the value of β may be updated. The value of β may be updated based on the performance of the system assessed at step 1102. For example, if the performance of the system has improved since the last time β was updated, β may be updated in a similar manner to attempt to achieve a similar performance improvement. If the performance of the system has decreased since the last time β was updated, the previous value of β may be restored. Returning to step 1106, if it is determined that the receiver interference information should not be updated, the process can move to step 1110.

At step 1110, a determination can be made as to whether the transmitter interference information should be updated. This determination may be based on a setting or mode of operation of the system. If the transmitter interference information should be updated, at step 1112, the value of α may be updated. Like with the value of β described above, the value of α may be updated based on the performance of the system assessed at step 1102. Otherwise, the process can return to step 1102, and the performance of the system can be assessed again either immediately or after a predetermined period of time.

Figure 12:
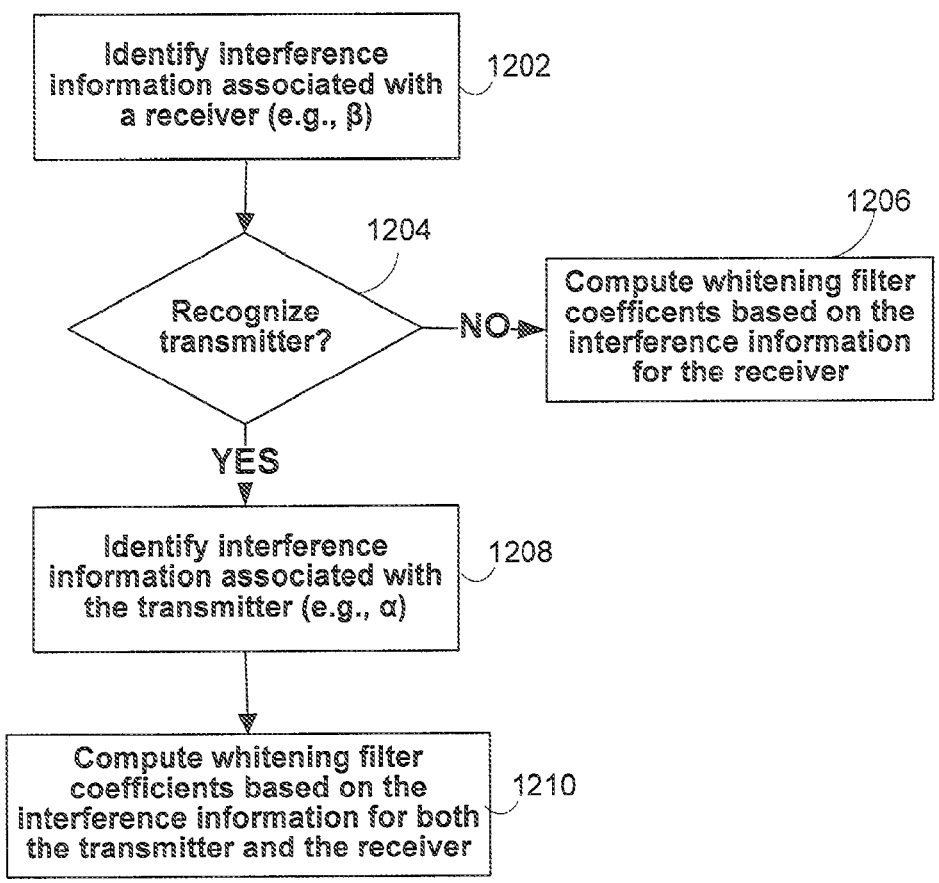
FIG. 12 shows an illustrative flow diagram for computing whitening filter coefficients based on whether the transmitter is recognized by the receiver.

Referring now to FIG. 12, illustrative flow diagram 1200 is shown for computing whitening filter coefficients based on available transmitter interference information. At step 1202, interference information associated with the receiver (e.g., β) is identified. The interference information may be obtained by a table lookup into a storage module (e.g., storage module 712 of FIG. 7). At step 1204, a determination can be made as to whether the transmitter is recognized. The transmitter can be identified based on a predetermined identification packet received from the transmitter (e.g., when the transmitter is initializing), or based on a particular handshaking protocol between the transmitter and the receiver.

If, at step 1204, it is determined that the transmitter is not recognized, the process can move to step 1206. At step 1206, the whitening filter coefficients can be computed based on only the interference information associated with the receiver obtained at step 1202. For example, an interference term of a signal may be modeled based on only receiver-side input coupling, and the receiver can compute whitening filter coefficients based on the covariance of this interference term. Returning to step 1204, if it is instead determined that the transmitter is recognized, the process of flow diagram 1200 can move to step 1208. At step 1208, interference information associated with the transmitter (e.g., α) may be obtained. This interference information may be obtained from a table lookup, where the location of the table lookup depends on the particular transmitter being used. Then, at step 1210, whitening filter coefficients are computed based on both the interference information associated with the receiver identified at step 1202 and on the interference information associated with the transmitter identified at step 1208. For example, the whitening filter coefficients may be computed based on a covariance matrix of the interference term shown in FIG. 6.

Referring now to FIGS. 13-19, various exemplary implementations of the present invention are shown.

Figure 13:
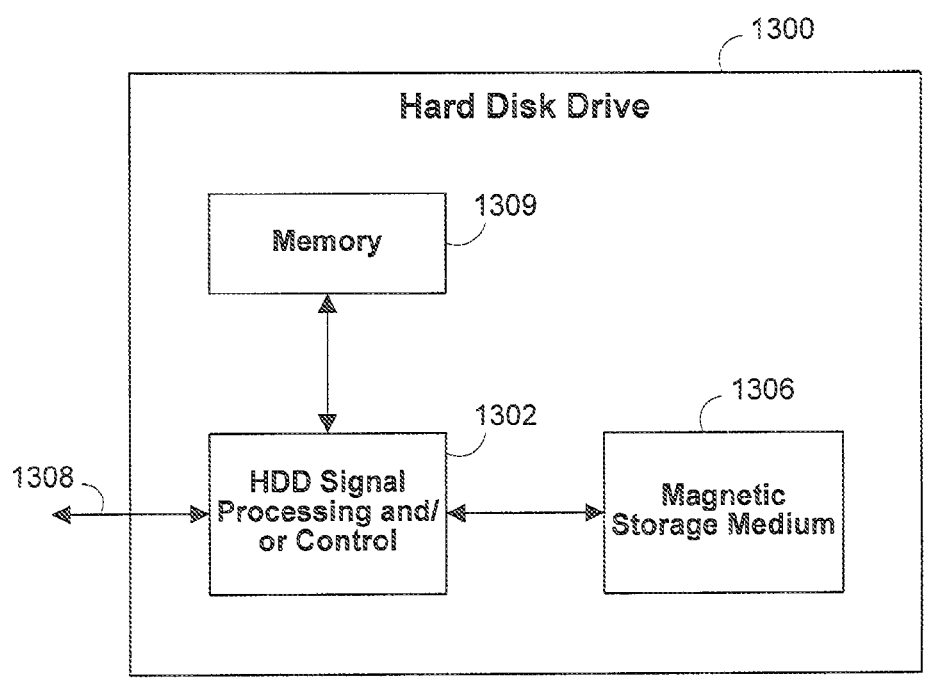
FIG. 13 is a block diagram of an exemplary hard disk drive that can employ the disclosed technology.

Referring now to FIG. 13, the present invention can be implemented in a hard disk drive 1300. The present invention may implement either or both signal processing and/or control circuits, which are generally identified in FIG. 13 at 1302. In some implementations, the signal processing and/or control circuit 1302 and/or other circuits (not shown) in the HDD 1300 may process data, perform coding and/or encryption, perform calculations, and/or format data that is output to and/or received from a magnetic storage medium 1306.

The HDD 1300 may communicate with a host device (not shown) such as a computer, mobile computing devices such as personal digital assistants, cellular phones, media or MP3 players and the like, and/or other devices via one or more wired or wireless communication links 1308. The HDD 1300 may be connected to memory 1309 such as random access memory (RAM), nonvolatile memory such as flash memory, read only memory (ROM) and/or other suitable electronic data storage.

Figure 14:
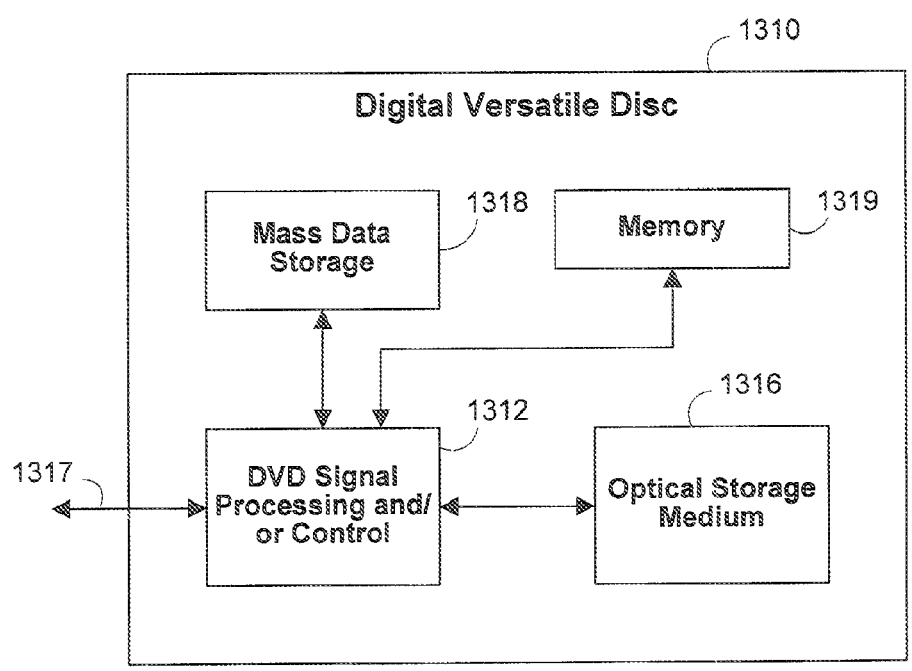
FIG. 14 is a block diagram of an exemplary digital versatile disc that can employ the disclosed technology.

Referring now to FIG. 14, the present invention can be implemented in a digital versatile disc (DVD) drive 1310. The present invention may implement either or both signal processing and/or control circuits, which are generally identified in FIG. 14 at 1312, and/or mass data storage 1318 of the DVD drive 1310. The signal processing and/or control circuit 1312 and/or other circuits (not shown) in the DVD drive 1310 may process data, perform coding and/or encryption, perform calculations, and/or format data that is read from and/or data written to an optical storage medium 1316. In some implementations, the signal processing and/or control circuit 1312 and/or other circuits (not shown) in the DVD drive 1310 can also perform other functions such as encoding and/or decoding and/or any other signal processing functions associated with a DVD drive.

The DVD drive 1310 may communicate with an output device (not shown) such as a computer, television or other device via one or more wired or wireless communication links 1317. The DVD drive 1310 may communicate with mass data storage 1318 that stores data in a nonvolatile manner. The mass data storage 1318 may include a hard disk drive (HDD). The HDD may have the configuration shown in FIG. 13. The HDD may be a mini HDD that includes one or more platters having a diameter that is smaller than approximately 1.8". The DVD drive 1310 may be connected to memory 1319 such as RAM, ROM, nonvolatile memory such as flash memory and/or other suitable electronic data storage.

Figure 15:
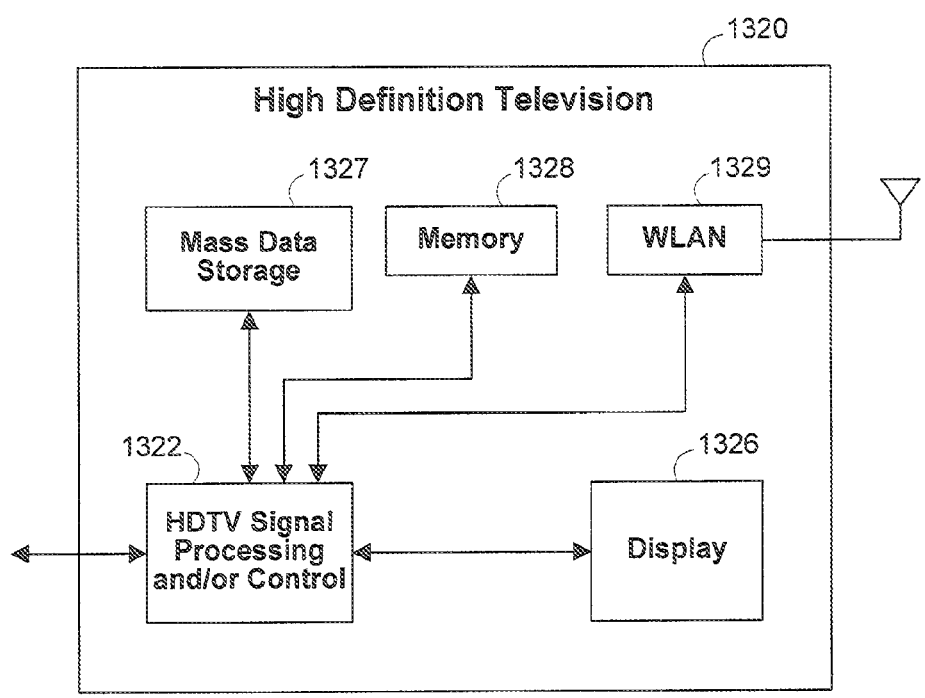
FIG. 15 is a block diagram of an exemplary high definition television that can employ the disclosed technology.

Referring now to FIG. 15, the present invention can be implemented in a high definition television (HDTV) 1320. The present invention may implement either or both signal processing and/or control circuits, which are generally identified in FIG. 15 at 1322, a WLAN interface 1327 and/or mass data storage 1329 of the HDTV 1320. The HDTV 1320 receives HDTV input signals in either a wired or wireless format and generates HDTV output signals for a display 1326. In some implementations, signal processing circuit and/or control circuit 1322 and/or other circuits (not shown) of the HDTV 1320 may process data, perform coding and/or encryption, perform calculations, format data and/or perform any other type of HDTV processing that may be required.

The HDTV 1320 may communicate with mass data storage 1327 that stores data in a nonvolatile manner such as optical and/or magnetic storage devices for example hard disk drives HDD and/or DVDs. At least one HDD may have the configuration shown in FIG. 13 and/or at least one DVD may have the configuration shown in FIG. 14. The HDD may be a mini HDD that includes one or more platters having a diameter that is smaller than approximately 1.8". The HDTV 1320 may be connected to memory 1328 such as RAM, ROM, nonvolatile memory such as flash memory and/or other suitable electronic data storage. The HDTV 1320 also may support connections with a WLAN via a WLAN network interface 1329.

Figure 16:
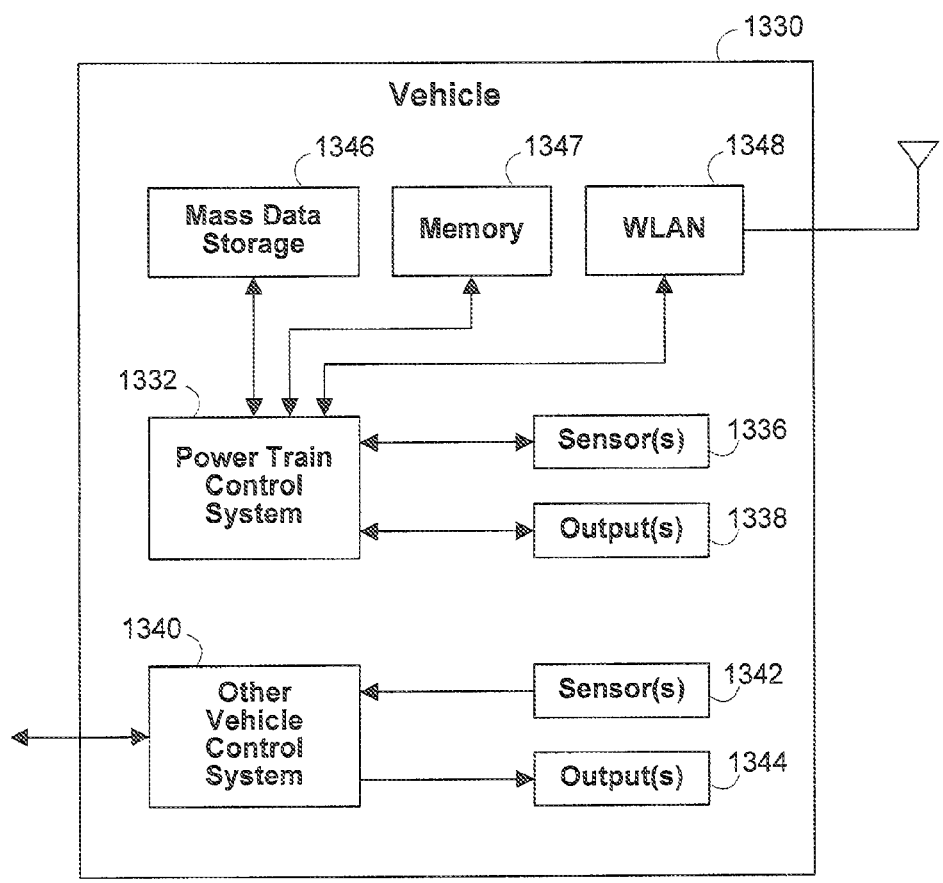
FIG. 16 is a block diagram of an exemplary vehicle that can employ the disclosed technology.

Referring now to FIG. 16, the present invention implements a control system of a vehicle 1330, a WLAN interface 1348 and/or mass data storage 1346 of the vehicle control system. In some implementations, the present invention may implement a powertrain control system 1332 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 1340 of the vehicle 1330. The control system 1340 may likewise receive signals from input sensors 1342 and/or output control signals to one or more output devices 1344. In some implementations, the control system 1340 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 1332 may communicate with mass data storage 1346 that stores data in a nonvolatile manner. The mass data storage 1346 may include optical and/or magnetic storage devices for example hard disk drives HDD and/or DVDs. At least one HDD may have the configuration shown in FIG. 13 and/or at least one DVD may have the configuration shown in FIG. 14. The HDD may be a mini HDD that includes one or more platters having a diameter that is smaller than approximately 1.8". The powertrain control system 1332 may be connected to memory 1347 such as RAM, ROM, nonvolatile memory such as flash memory and/or other suitable electronic data storage. The powertrain control system 1332 also may support connections with a WLAN via a WLAN network interface 1348. The control system 1340 may also include mass data storage, memory and/or a WLAN interface (all not shown).

Figure 17:
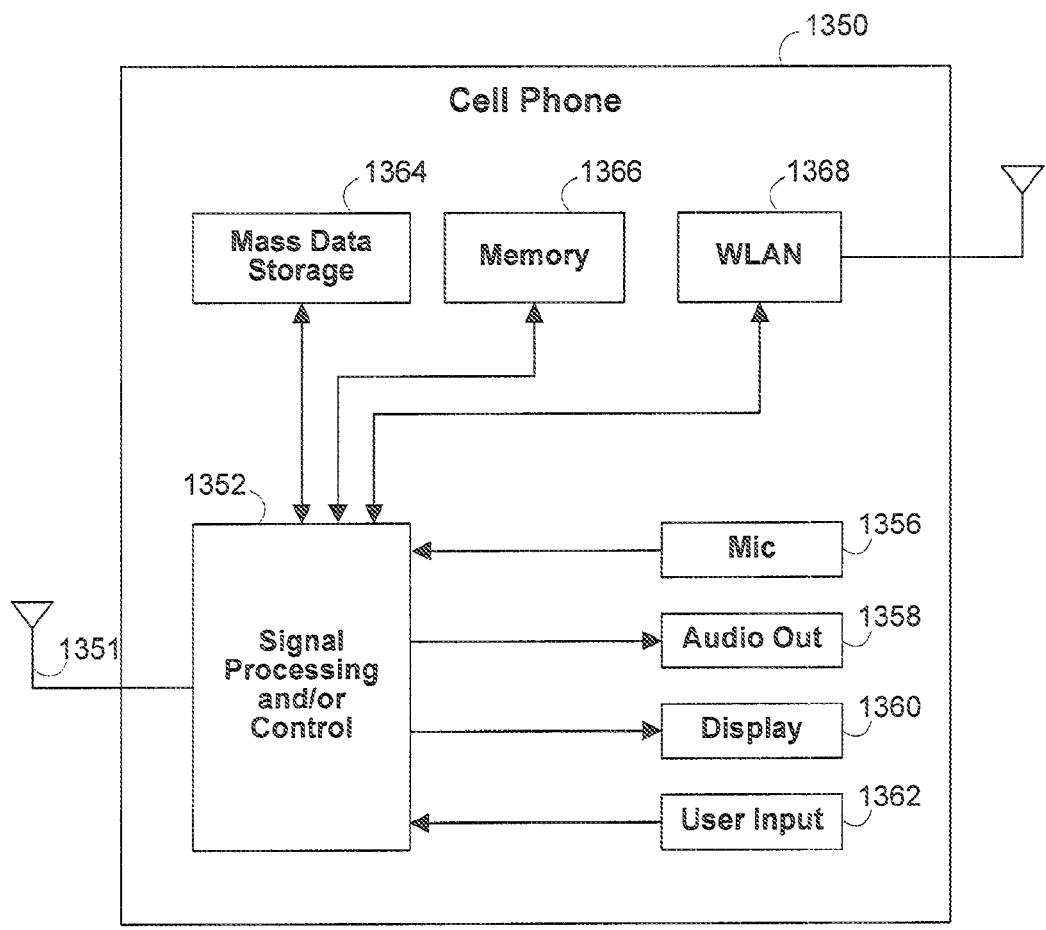
FIG. 17 is a block diagram of an exemplary cell phone that can employ the disclosed technology.

Referring now to FIG. 17, the present invention can be implemented in a cellular phone 1350 that may include a cellular antenna 1351. The present invention may implement either or both signal processing and/or control circuits, which are generally identified in FIG. 17 at 1352, a WLAN interface 1368 and/or mass data storage 1364 of the cellular phone 1350. In some implementations, the cellular phone 1350 includes a microphone 1356, an audio output 1358 such as a speaker and/or audio output jack, a display 1360 and/or an input device 1362 such as a keypad, pointing device, voice actuation and/or other input device. The signal processing and/or control circuits 1352 and/or other circuits (not shown) in the cellular phone 1350 may process data, perform coding and/or encryption, perform calculations, format data and/or perform other cellular phone functions.

The cellular phone 1350 may communicate with mass data storage 1364 that stores data in a nonvolatile manner such as optical and/or magnetic storage devices for example hard disk drives HDD and/or DVDs. At least one HDD may have the configuration shown in FIG. 13 and/or at least one DVD may have the configuration shown in FIG. 14. The HDD may be a mini HDD that includes one or more platters having a diameter that is smaller than approximately 1.8". The cellular phone 1350 may be connected to memory 1366 such as RAM, ROM, nonvolatile memory such as flash memory and/or other suitable electronic data storage. The cellular phone 1350 also may support connections with a WLAN via a WLAN network interface 1368.

Figure 18:
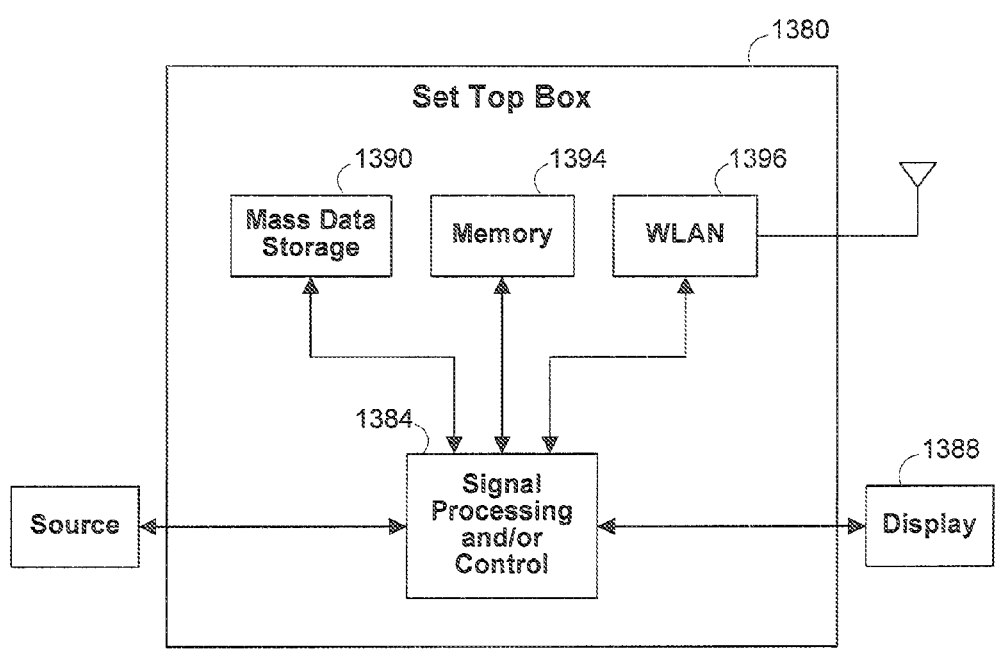
FIG. 18 is a block diagram of an exemplary set top box that can employ the disclosed technology.

Referring now to FIG. 18, the present invention can be implemented in a set top box 1380. The present invention may implement either or both signal processing and/or control circuits, which are generally identified in FIG. 18 at 1384, a WLAN interface 1396 and/or mass data storage 1390 of the set top box 1380. The set top box 1380 receives signals from a source such as a broadband source and outputs standard and/or high definition audio/video signals suitable for a display 1388 such as a television and/or monitor and/or other video and/or audio output devices. The signal processing and/or control circuits 1384 and/or other circuits (not shown) of the set top box 1380 may process data, perform coding and/or encryption, perform calculations, format data and/or perform any other set top box function.

The set top box 1380 may communicate with mass data storage 1390 that stores data in a nonvolatile manner. The mass data storage 1390 may include optical and/or magnetic storage devices for example hard disk drives HDD and/or DVDs. At least one HDD may have the configuration shown in FIG. 13 and/or at least one DVD may have the configuration shown in FIG. 14. The HDD may be a mini HDD that includes one or more platters having a diameter that is smaller than approximately 1.8". The set top box 1380 may be connected to memory 1394 such as RAM, ROM, nonvolatile memory such as flash memory and/or other suitable electronic data storage. The set top box 1380 also may support connections with a WLAN via a WLAN network interface 1396.

Figure 19:
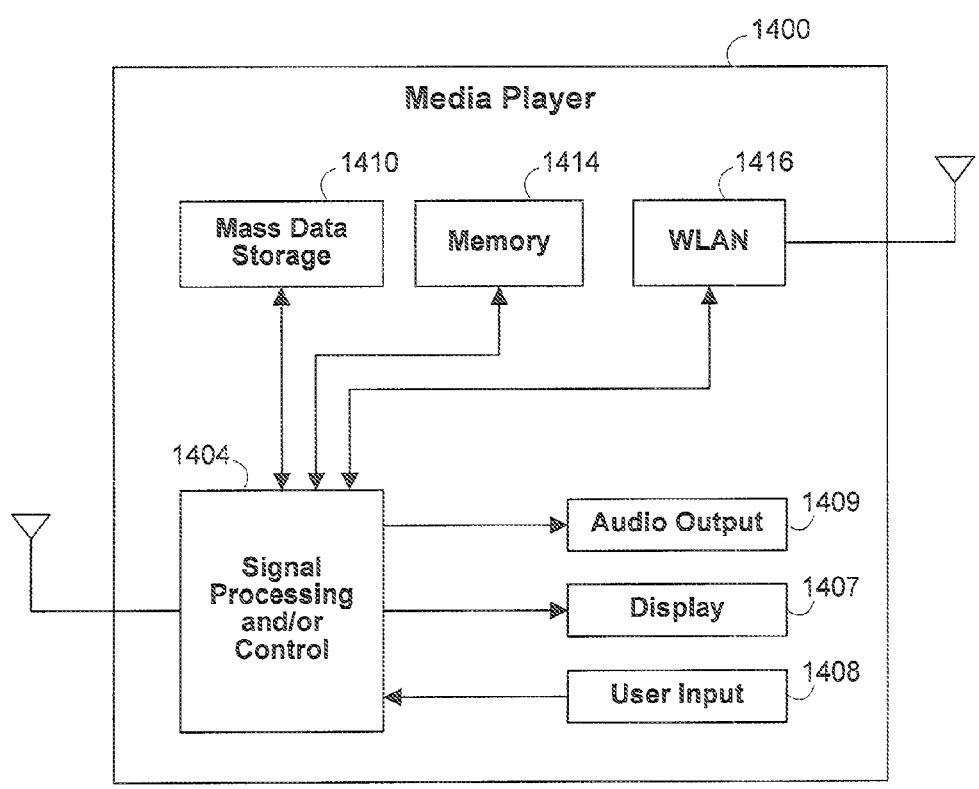
FIG. 19 is a block diagram of an exemplary media player that can employ the disclosed technology.

Referring now to FIG. 19, the present invention can be implemented in a media player 1400. The present invention may implement either or both signal processing and/or control circuits, which are generally identified in FIG. 19 at 1404, a WLAN interface 1416 and/or mass data storage 1410 of the media player 1400. In some implementations, the media player 1400 includes a display 1407 and/or a user input 1408 such as a keypad, touchpad and the like. In some implementations, the media player 1400 may employ a graphical user interface (GUI) that typically employs menus, drop down menus, icons and/or a point-and-click interface via the display 1407 and/or user input 1408. The media player 1400 further includes an audio output 1409 such as a speaker and/or audio output jack. The signal processing and/or control circuits 1404 and/or other circuits (not shown) of the media player 1400 may process data, perform coding and/or encryption, perform calculations, format data and/or perform any other media player function.

The media player 1400 may communicate with mass data storage 1410 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 13 and/or at least one DVD may have the configuration shown in FIG. 14. The HDD may be a mini HDD that includes one or more platters having a diameter that is smaller than approximately 1.8". The media player 1400 may be connected to memory 1414 such as RAM, ROM, nonvolatile memory such as flash memory and/or other suitable electronic data storage. The media player 1400 also may support connections with a WLAN via a WLAN network interface 1416. Still other implementations in addition to those described above are contemplated.

The foregoing describes systems and methods for whitening a noise component in a received signal caused by MIMO transmitter and MIMO receiver imperfections. Those skilled in the art will appreciate that the invention can be practiced by other than the described embodiments, which are presented for the purpose of illustration rather than of limitation.

What is claimed is:

1. A method of processing a signal vector in a wireless multiple-input multiple-output (MIMO) receiver, the method comprising:
    obtaining the signal vector from a wireless MIMO transmitter;
    filtering the obtained signal vector using a whitening filter, wherein coefficients of the whitening filter are adapted to whiten an interference term derived from a first coupling between outputs of the MIMO transmitter and a second coupling between inputs of the MIMO receiver, and wherein the coefficients are generated based on pre-stored weighting factors each associated with a system configuration of the MIMO receiver and transmitter; and
    outputting a filtered signal vector with a whitened interference term.

2. The method of claim 1, wherein:
    the signal vector is modulated using orthogonal frequency-division multiplexing (OFDM);
    the outputs of the MIMO transmitter comprise orthogonal subcarriers;
    the inputs of the MIMO receiver comprise orthogonal subcarriers; and
    the interference term is derived from transmitter phase noise and receiver phase noise.

3. The method of claim 1, further comprising modeling the obtained signal vector in terms of an intended signal, the interference term, and a first white noise component.

4. The method of claim 3, wherein the filtered signal vector comprises the intended signal and a second white noise component, and wherein the second white noise component is a combination of the whitened interference term and the first white noise component.

5. The method of claim 1, further comprising providing the outputted filtered signal vector to a decoder.

6. The method of claim 5, wherein the decoder is a maximum-likelihood decoder.

7. The method of claim 1, wherein the first coupling is based on a first set of interference information associated with the MIMO transmitter, and wherein the second coupling is based on a second set of interference information associated with the MIMO receiver.

8. The method of claim 7, wherein the first coupling produces, for each output of the MIMO transmitter, a weighted addition of the outputs based on the first set of interference information.

9. The method of claim 7, wherein the second coupling produces, for each input of the MIMO receiver, a weighted addition of the inputs based on the second set of interference information.

10. The method of claim 7, further comprising:
assessing a performance of the MIMO receiver; updating the second set of interference information based on the assessed performance; and
assessing a performance of the MIMO receiver; updating the second set of interference information based on the assessed performance; and
updating the coefficients of the whitening filter based on the updated second set of interference information.

11. The method of claim 1, wherein filtering comprises:
computing a covariance matrix of the interference term; and
whitening the interference term based on the covariance matrix of the interference term.

12. The method of claim 11, further comprising factoring the covariance matrix using a Cholesky factorization, wherein the interference term is whitened based on the factored covariance matrix.

13. The method of claim 1, further comprising:
determining whether the MIMO transmitter is of a recognized type; and
filtering the signal vector based on a different interference term when the MIMO transmitter is not of a recognized type, wherein the different interference term is derived from only the second coupling.

14. The method of claim 1, further comprising selecting the pre-stored weighting factors from a set of pre-stored weighting factors associated with a plurality of system configurations of the MIMO receiver and transmitter, wherein the system configurations of the MIMO receiver and transmitter comprise operating modes or settings of the MIMO receiver and transmitter.

15. Apparatus for processing a signal vector in a wireless multiple-input multiple-output (MIMO) receiver, the apparatus comprising:
means for obtaining the signal vector from a wireless MIMO transmitter;
means for filtering the obtained signal vector using a whitening filter, wherein coefficients of the whitening filter are adapted to whiten an interference term derived from a first coupling between outputs of the MIMO transmitter and a second coupling between inputs of the MIMO receiver, and wherein the coefficients are generated based on pre-stored weighting factors each associated with a system configuration of the MIMO receiver and transmitter; and
means for outputting a filtered signal vector with a whitened interference term.

16. The apparatus of claim 15, wherein:
the signal vector is modulated using orthogonal frequency-division multiplexing (OFDM);
the outputs of the MIMO transmitter comprise orthogonal subcarriers;
the inputs of the MIMO receiver comprise orthogonal subcarriers; and
the interference term is derived from transmitter phase noise and receiver phase noise.

17. The apparatus of claim 15, further comprising means for modeling the obtained signal vector in terms of an intended signal, the interference term, and a first white noise component.

18. The apparatus of claim 17, wherein the filtered signal vector comprises the intended signal and a second white noise component, and wherein the second white noise component is a combination of the whitened interference term and the first white noise component.

19. The apparatus of claim 15, further comprising means for providing the outputted filtered signal vector to a decoder.

20. The apparatus of claim 19, wherein the decoder is a maximum-likelihood decoder.

21. The apparatus of claim 15, wherein the first coupling is based on a first set of interference information associated with the MIMO transmitter, and wherein the second coupling is based on a second set of interference information associated with the MIMO receiver.

22. The apparatus of claim 21, wherein the first coupling produces, for each output of the MIMO transmitter, a weighted addition of the outputs based on the first set of interference information.

23. The apparatus of claim 21, wherein the second coupling produces, for each input of the MIMO receiver, a weighted addition of the inputs based on the second set of interference information.

24. The apparatus of claim 21, further comprising:
means for assessing a performance of the MIMO receiver;
means for updating the second set of interference information based on the assessed performance; and
means for updating the coefficients of the whitening filter based on the updated second set of interference information.

25. The apparatus of claim 15, wherein means for filtering comprises:
means for computing a covariance matrix of the interference term; and
means for whitening the interference term based on the covariance matrix of the interference term.

26. The apparatus of claim 25, further comprising means for factoring the covariance matrix using a Cholesky factorization, wherein the interference term is whitened based on the factored covariance matrix.

27. The apparatus of claim 15, further comprising:
means for determining whether the MIMO transmitter is of a recognized type; and
means for filtering the signal vector based on a different interference term when the MIMO transmitter is not of a recognized type, wherein the different interference term is derived from only the second coupling.

28. The apparatus of claim 15, wherein the pre-stored weighting factors are selected from a set of prestored weighting factors associated with a plurality of system configurations of the MIMO receiver and transmitter, wherein the system configurations of the MIMO receiver and transmitter comprise operating modes or settings of the MIMO receiver and transmitter.

29. A whitening filter for a wireless multiple-input multiple-output (MIMO) receiver, comprising:
an input interface for obtaining a signal vector from a wireless MIMO transmitter; and
whitening filter coefficients for whitening an interference term of the obtained signal vector, wherein the interference term is derived from a first coupling between outputs of the MIMO transmitter and a second coupling between inputs of the MIMO receiver, and wherein the coefficients are generated based on pre-stored weighting factors each associated with a system configuration of the MIMO receiver and transmitter.

30. The whitening filter of claim 29, wherein:
the signal vector is modulated using orthogonal frequency-division multiplexing (OFDM);
the outputs of the MIMO transmitter comprise orthogonal subcarriers;
the inputs of the MIMO receiver comprise orthogonal subcarriers; and
the interference term is derived from transmitter phase noise and receiver phase noise.

31. The whitening filter of claim 29, wherein the whitening filter coefficients are configured to whiten noise based on a signal model for the signal vector, wherein the signal model models each component of the signal vector as an intended signal, the interference term, and a first white noise component.

32. The whitening filter of claim 31, further comprising an output interface for outputting a filtered signal vector comprising the intended signal and a second white noise component, wherein the second white noise component includes the whitened interference term and the first white noise component.

33. The whitening filter of claim 29, wherein the first coupling is based on a first set of interference information associated with the MIMO transmitter, and wherein the second coupling is based on a second set of interference information associated with the MIMO receiver.

34. The whitening filter of claim 33, wherein the first coupling produces, for each output of the MIMO transmitter, a weighted addition of the outputs based on the first set of interference information.

35. The whitening filter of claim 33, wherein the second coupling produces, for each input of the MIMO receiver, a weighted addition of the inputs based on the second set of interference information.

36. The whitening filter of claim 33, further comprising logic for:
assessing a performance of the MIMO receiver; updating the second set of interference information based on the assessed performance; and
updating the coefficients of the whitening filter based on the updated second set of interference information.

37. The whitening filter of claim 29, wherein the whitening filter coefficients are based on a covariance matrix of the interference term.

38. The whitening filter of claim 37, wherein the whitening filter coefficients are based on a Cholesky factorization of the covariance matrix.

39. A receiver having the whitening filter defined in claim 29, further comprising a decoder coupled to an output of the whitening filter.

40. The receiver of claim 29, wherein the decoder is a maximum-likelihood decoder.

41. A receiver having the whitening filter defined in claim 29, further comprising a storage for storing transmitter-side interference for different transmitters, wherein:
the whitening filter filters the signal vector based on a different interference term when the storage does not include transmitter-side interference information associated with the MIMO transmitter; and
the different interference term is derived from only the second coupling.

42. The whitening filter of claim 29, wherein the pre-stored weighting factors are selected from a set of pre-stored weighting factors associated with a plurality of system configurations of the MIMO receiver and transmitter, wherein the system configurations of the MIMO receiver and transmitter comprise operating modes or settings of the MIMO receiver and transmitter.

* * * * *